US011763365B2

(12) United States Patent
Bleicher et al.

(10) Patent No.: US 11,763,365 B2
(45) Date of Patent: Sep. 19, 2023

(54) SYSTEM, PLATFORM AND METHOD FOR PERSONALIZED SHOPPING USING AN AUTOMATED SHOPPING ASSISTANT

(71) Applicant: NIKE, Inc., Beaverton, OR (US)

(72) Inventors: David Bleicher, Tel-Aviv (IL); Tamir Lousky, Bat-Yam (IL)

(73) Assignee: NIKE, Inc., Beaverton, OR (US)

( * ) Notice: Subject to any disclaimer, the term of this patent is extended or adjusted under 35 U.S.C. 154(b) by 553 days.

(21) Appl. No.: 16/623,178

(22) PCT Filed: Jun. 27, 2018

(86) PCT No.: PCT/US2018/039781
§ 371 (c)(1),
(2) Date: Dec. 16, 2019

(87) PCT Pub. No.: WO2019/005986
PCT Pub. Date: Jan. 3, 2019

(65) Prior Publication Data
US 2021/0142379 A1 May 13, 2021

Related U.S. Application Data

(60) Provisional application No. 62/525,454, filed on Jun. 27, 2017.

(51) Int. Cl.
*G06Q 30/0601* (2023.01)
*G01B 11/22* (2006.01)
*G01B 11/24* (2006.01)

(52) U.S. Cl.
CPC ......... *G06Q 30/0613* (2013.01); *G01B 11/22* (2013.01); *G01B 11/24* (2013.01); *G06Q 30/0643* (2013.01)

(58) Field of Classification Search
CPC .......... G06Q 30/0613; G06Q 30/0643; G01B 11/22; G01B 11/24
See application file for complete search history.

(56) References Cited

U.S. PATENT DOCUMENTS

| | | | |
|---|---|---|---|
| 5,164,793 A | 11/1992 | Wolfersberger et al. |
| 5,689,446 A | 11/1997 | Sundman et al. |
| | (Continued) | | |

FOREIGN PATENT DOCUMENTS

| | | | |
|---|---|---|---|
| CN | 101707946 A | 5/2010 |
| CN | 101742048 A | 6/2010 |
| | (Continued) | | |

OTHER PUBLICATIONS

M. Yuan, I. R. Khan, F. Farbiz, S. Yao, A. Niswarand M. -H. Foo, "A Mixed Reality Virtual Clothes Try-On System," in IEEE Transactions on Multimedia, vol. 15, No. 8, pp. 1958-1968, Dec. 2013, doi: 10.1109/TMM.2013.2280560 (Year: 2013).*

(Continued)

*Primary Examiner* — Michelle T Kringen
(74) *Attorney, Agent, or Firm* — Banner & Witcoff, Ltd.

(57) ABSTRACT

There is provided, in accordance with an embodiment of the present invention, an apparatus, system, and method to provide personalized online product fitting, according to some embodiments. One embodiment of the invention includes a method for personalized shopping has the steps of an automated shopping assistant system accessing product data, a matchmaking system accessing user history data, the matchmaking system accessing user preference data, the matchmaking system accessing user anatomical data acquired from an automated shopping assistant apparatus, the automated shopping assistant system matching user history, preference and anatomical data with data to generate a personalized matching system.

20 Claims, 25 Drawing Sheets

(56) References Cited

U.S. PATENT DOCUMENTS

| | | |
|---|---|---|
| 6,289,107 B1 | 9/2001 | Borchers et al. |
| 6,546,356 B1 | 4/2003 | Genest |
| 8,065,200 B2 | 11/2011 | Schwartz |
| 8,567,081 B2 | 10/2013 | Smith |
| 8,655,053 B1 | 2/2014 | Hansen |
| 8,818,883 B2 | 8/2014 | Lawrence et al. |
| 8,868,157 B1 | 10/2014 | Soliz |
| 8,908,928 B1 | 12/2014 | Hansen |
| 9,345,957 B2 | 5/2016 | Geisner et al. |
| 9,386,889 B2 | 7/2016 | Fischer |
| 9,449,343 B2 | 9/2016 | Mayerle et al. |
| 9,462,838 B1 | 10/2016 | Smith et al. |
| 9,477,980 B2 | 10/2016 | Zagel et al. |
| 9,648,926 B2 | 5/2017 | Marks |
| 9,799,064 B2 | 10/2017 | Ohnemus et al. |
| 9,875,546 B1 | 1/2018 | Bhole et al. |
| 9,996,981 B1 | 6/2018 | Tran et al. |
| 10,008,040 B2 | 6/2018 | Lam et al. |
| 10,013,803 B2 | 7/2018 | Mach Shepherd et al. |
| 10,067,500 B2 | 9/2018 | Hargovan et al. |
| 10,380,794 B2 | 8/2019 | Hauswiesner et al. |
| 10,420,397 B2 | 9/2019 | Hei et al. |
| 10,573,004 B2 | 2/2020 | Husheer |
| 10,755,431 B2 | 8/2020 | Shea et al. |
| 11,324,285 B2 | 5/2022 | Hei et al. |
| 2002/0138170 A1 | 9/2002 | Onyshkevych et al. |
| 2002/0140694 A1 | 10/2002 | Sauer et al. |
| 2003/0195623 A1 | 10/2003 | Marchitto et al. |
| 2004/0081336 A1 | 4/2004 | Brooks |
| 2006/0104503 A1* | 5/2006 | Huang ............... A61B 5/1077 |
| | | 382/154 |
| 2007/0005174 A1 | 1/2007 | Thomas |
| 2007/0056212 A1 | 3/2007 | Fink |
| 2008/0040278 A1 | 2/2008 | DeWitt |
| 2009/0051683 A1 | 2/2009 | Goonetilleke et al. |
| 2009/0247909 A1* | 10/2009 | Mukumoto ......... A61B 5/1036 |
| | | 600/592 |
| 2009/0287452 A1 | 11/2009 | Stanley et al. |
| 2010/0111370 A1 | 5/2010 | Black et al. |
| 2010/0296726 A1 | 11/2010 | Rutschmann et al. |
| 2011/0047046 A1 | 2/2011 | Torres |
| 2011/0093344 A1 | 4/2011 | Burke et al. |
| 2011/0298897 A1 | 12/2011 | Sareen et al. |
| 2012/0054041 A1* | 3/2012 | Williams ........... G06Q 30/0251 |
| | | 705/14.66 |
| 2012/0106796 A1 | 5/2012 | Jones et al. |
| 2012/0249741 A1 | 10/2012 | Maciocci et al. |
| 2013/0095924 A1 | 4/2013 | Geisner et al. |
| 2013/0100256 A1 | 4/2013 | Kirk et al. |
| 2013/0114869 A1 | 5/2013 | Hernandez Stark et al. |
| 2013/0218721 A1 | 8/2013 | Borhan et al. |
| 2013/0246222 A1 | 9/2013 | Weerasinghe |
| 2013/0307851 A1 | 11/2013 | Stark et al. |
| 2014/0040041 A1 | 2/2014 | Ohnemus et al. |
| 2014/0089134 A1 | 3/2014 | Linh et al. |
| 2014/0104395 A1 | 4/2014 | Rohaly et al. |
| 2014/0108208 A1 | 4/2014 | Piana |
| 2014/0156449 A1 | 6/2014 | Ganesan et al. |
| 2014/0176565 A1 | 6/2014 | Adeyoola et al. |
| 2014/0270540 A1 | 9/2014 | Spector et al. |
| 2014/0285646 A1 | 9/2014 | Kahlon |
| 2014/0358738 A1 | 12/2014 | Ohnemus et al. |
| 2015/0012380 A1 | 1/2015 | Bank et al. |
| 2015/0039422 A1 | 2/2015 | Abraham et al. |
| 2015/0066707 A1 | 3/2015 | Unger et al. |
| 2015/0066712 A1 | 3/2015 | Altieri |
| 2015/0127132 A1 | 5/2015 | Nyong'o et al. |
| 2015/0127363 A1 | 5/2015 | Nyong'o et al. |
| 2015/0133754 A1 | 5/2015 | Freeman et al. |
| 2015/0154453 A1 | 6/2015 | Wilf |
| 2015/0199816 A1 | 7/2015 | Freeman et al. |
| 2015/0223730 A1 | 8/2015 | Ferrantelli |
| 2015/0228084 A1 | 8/2015 | Belyaev et al. |
| 2015/0258431 A1 | 9/2015 | Stafford et al. |
| 2015/0328016 A1 | 11/2015 | Summit et al. |
| 2015/0339752 A1 | 11/2015 | Chetuparambil et al. |
| 2015/0342266 A1 | 12/2015 | Cooper et al. |
| 2015/0359461 A1 | 12/2015 | Alfaro et al. |
| 2016/0063613 A1 | 3/2016 | Zhao et al. |
| 2016/0071143 A1 | 3/2016 | Pokorney et al. |
| 2016/0081435 A1 | 3/2016 | Marks |
| 2016/0093085 A1* | 3/2016 | Ray ..................... G16H 50/50 |
| | | 345/419 |
| 2016/0110479 A1 | 4/2016 | Li |
| 2016/0125499 A1 | 5/2016 | Gooch et al. |
| 2016/0180391 A1* | 6/2016 | Zabaneh ............ G06F 16/9535 |
| | | 705/14.58 |
| 2016/0183879 A1 | 6/2016 | Goldish et al. |
| 2016/0247017 A1 | 8/2016 | Sareen et al. |
| 2016/0286906 A1 | 10/2016 | Malal et al. |
| 2016/0350833 A1 | 12/2016 | Andon |
| 2016/0367191 A1 | 12/2016 | Esposito et al. |
| 2017/0004568 A1 | 1/2017 | Radner |
| 2017/0027477 A1* | 2/2017 | Charles ................ A61B 5/1036 |
| 2017/0056212 A1 | 3/2017 | Jonsson et al. |
| 2017/0061683 A1 | 3/2017 | Dorin et al. |
| 2017/0076011 A1 | 3/2017 | Gannon |
| 2017/0083971 A1 | 3/2017 | Ray et al. |
| 2017/0169571 A1 | 6/2017 | Hung et al. |
| 2017/0208245 A1 | 7/2017 | Castillo et al. |
| 2017/0272728 A1 | 9/2017 | Rafii et al. |
| 2017/0323299 A1 | 11/2017 | Davis |
| 2018/0033202 A1* | 2/2018 | Lam ..................... G06V 40/10 |
| 2018/0035762 A1 | 2/2018 | Towns et al. |
| 2018/0047200 A1 | 2/2018 | O'Hara et al. |
| 2018/0160776 A1 | 6/2018 | Hei et al. |
| 2018/0160777 A1 | 6/2018 | Hei et al. |
| 2018/0182091 A1 | 6/2018 | MacKinnon et al. |
| 2018/0240238 A1 | 8/2018 | Husheer |
| 2018/0247426 A1 | 8/2018 | Gluck et al. |
| 2018/0300445 A1 | 10/2018 | Schouwenburg et al. |
| 2018/0300791 A1 | 10/2018 | Ganesan et al. |
| 2019/0037134 A1 | 1/2019 | Merati |
| 2019/0082794 A1 | 3/2019 | Liu |
| 2019/0139252 A1 | 5/2019 | Zaiss et al. |
| 2019/0188784 A1 | 6/2019 | Bleicher et al. |
| 2021/0093050 A1 | 4/2021 | Lee et al. |
| 2022/0183424 A1 | 6/2022 | Nevala et al. |

FOREIGN PATENT DOCUMENTS

| | | |
|---|---|---|
| CN | 101819663 A | 9/2010 |
| CN | 201831042 U | 5/2011 |
| CN | 102200437 A | 9/2011 |
| CN | 102466472 A | 5/2012 |
| CN | 102682395 A | 9/2012 |
| CN | 103093543 A | 5/2013 |
| CN | 103597519 A | 2/2014 |
| CN | 103852130 A | 6/2014 |
| CN | 104040580 A | 9/2014 |
| CN | 104170519 A | 11/2014 |
| CN | 104699908 A | 6/2015 |
| CN | 105662681 A | 6/2016 |
| CN | 106372374 A | 2/2017 |
| CN | 106942837 A | 7/2017 |
| JP | H06149376 A | 5/1994 |
| JP | 2000515088 A | 11/2000 |
| JP | 2001101272 A | 4/2001 |
| JP | 2002203167 A | 7/2002 |
| JP | 2003127994 A | 5/2003 |
| JP | 2003331108 A | 11/2003 |
| JP | 2005169015 A | 6/2005 |
| JP | 2007526028 A | 9/2007 |
| JP | 2010510587 A | 4/2010 |
| JP | 2013050937 A | 3/2013 |
| JP | 2013097799 A | 5/2013 |
| JP | 2014040231 A | 3/2014 |
| JP | 2016001360 A | 1/2016 |
| JP | 2016040649 A | 3/2016 |
| JP | 2016532197 A | 10/2016 |
| JP | 201779809 A | 5/2017 |
| KR | 20100019067 A | 2/2010 |
| KR | 20100131404 A | 12/2010 |
| KR | 20120123842 A | 11/2012 |

(56) References Cited

FOREIGN PATENT DOCUMENTS

| | | |
|---|---|---|
| KR | 20120123845 A | 11/2012 |
| KR | 20130052159 A | 5/2013 |
| KR | 20140123977 A | 10/2014 |
| KR | 20150061089 A | 6/2015 |
| KR | 20150070459 A | 6/2015 |
| KR | 20160005977 A | 1/2016 |
| KR | 20160021118 A | 2/2016 |
| WO | 9748027 A1 | 12/1997 |
| WO | 2005006905 A1 | 1/2005 |
| WO | 2012072844 A1 | 6/2012 |
| WO | 2013026798 A1 | 2/2013 |
| WO | 2014159726 A1 | 10/2014 |
| WO | 2016051416 A1 | 4/2016 |
| WO | 2017127132 A1 | 7/2017 |
| WO | 2017220638 A1 | 12/2017 |
| WO | 2018048902 A1 | 3/2018 |
| WO | 2018109421 A1 | 6/2018 |

OTHER PUBLICATIONS

Jul. 9, 2019—(WO) ISR & WO—App. No. PCT/US19/014958.
Nov. 16, 2017—(WO) ISR & WO—App. No. PCT/US17/050281.
May 24, 2018—(WO) ISR & WO—App. No. PCT/IB18/050041.
Sep. 21, 2021—(WO) ISR & WO—App. No. PCT/US21/034932.
Anonymous: "How to Calculate Height of Android Phone from ground—Stack Overflow". Aug. 17, 2017 (Aug. 17, 2017), XP055836361, Retreived from the Internet: URL:https://stackoverflow.com/questions/17443936/how-to-calculate-height-of-android-phone-from-ground [retreived on Aug. 31, 2021].
Oct. 1, 2018—(WO) ISR & WO—App. No. PCT/US18/039781.
Geometrix announces unique web 3D virtual try-on solution (Oct. 23, 2000). PR Newswire Retrieved from https://dialog.proquest.com/professional/docview/444318359?accountid=161862 (Year: 2000).
Dec. 4, 2017 (WO) International Search Report—PCT/US17/43373, 12 pages.
"Accu Foot size", Accu foot size app review, Retrieved from the internet <URL https://www.apkmonk.com/app/com.accufootsize/>, 20157, 7 pages.
Ganesan, Anand, "Footwear Virtual Fitting Service for E-Commerce & Physical Stores", findmeashoe.com, Jul. 2018, 27 pages.
Xu, et al. "A personalized assistant in 3D virtual shopping environment," 2010 Second International Conference on Intelligent Human-Machine Systems and Cybernetics, vol. 2, IEEE, 2010, 4 pages.

* cited by examiner

Front View

Isometric View

Isometric Front

Isometric Back

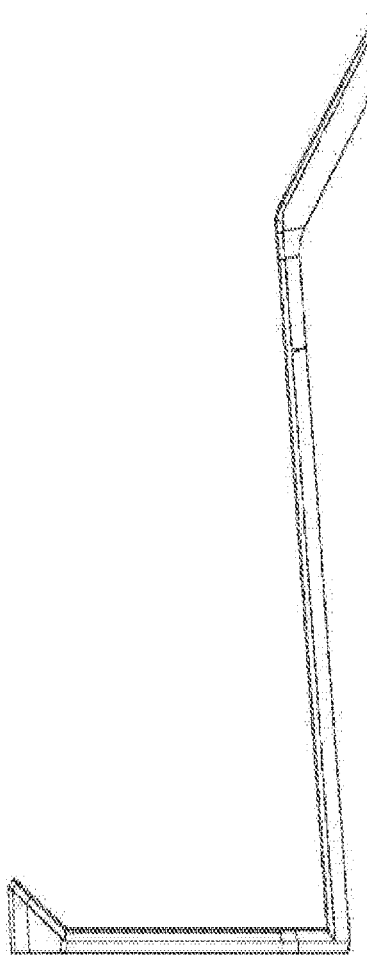 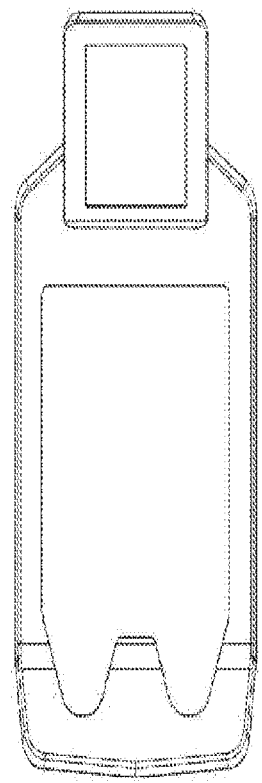
FIG. 8F
Side View
FIG. 8G
Top view

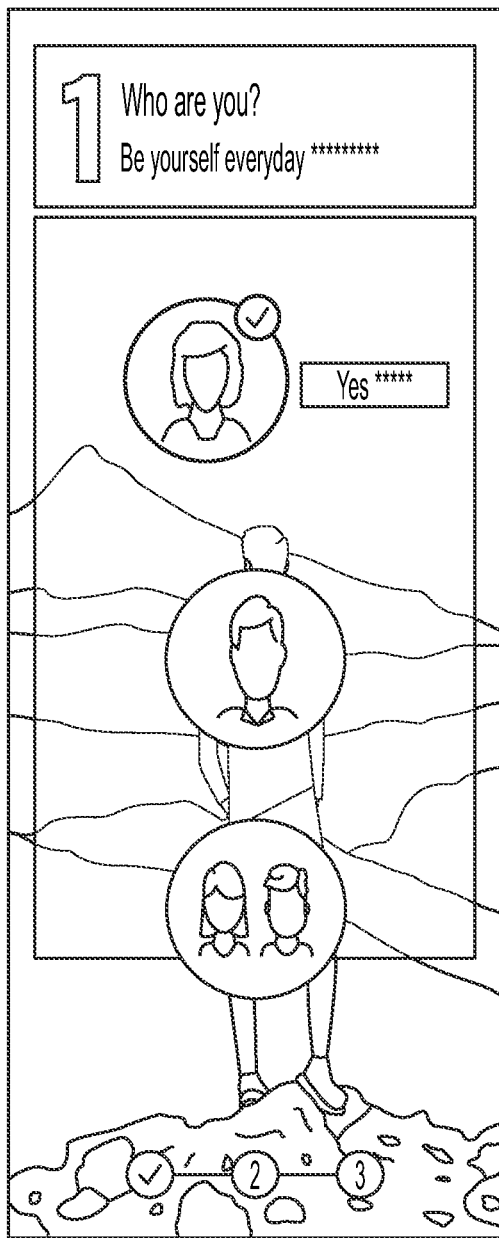
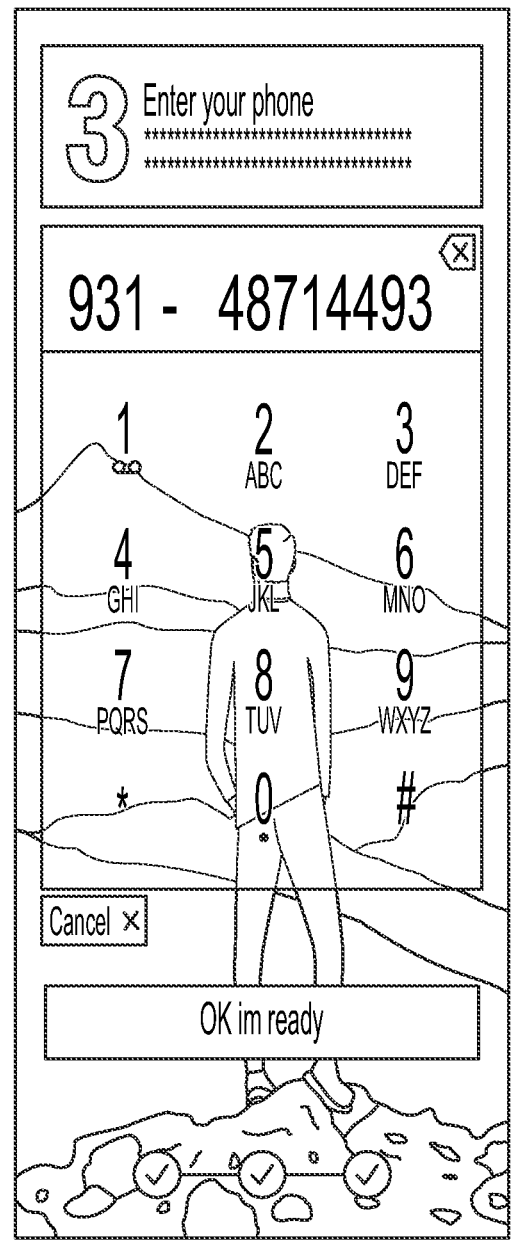
FIG. 13A                    FIG. 13B

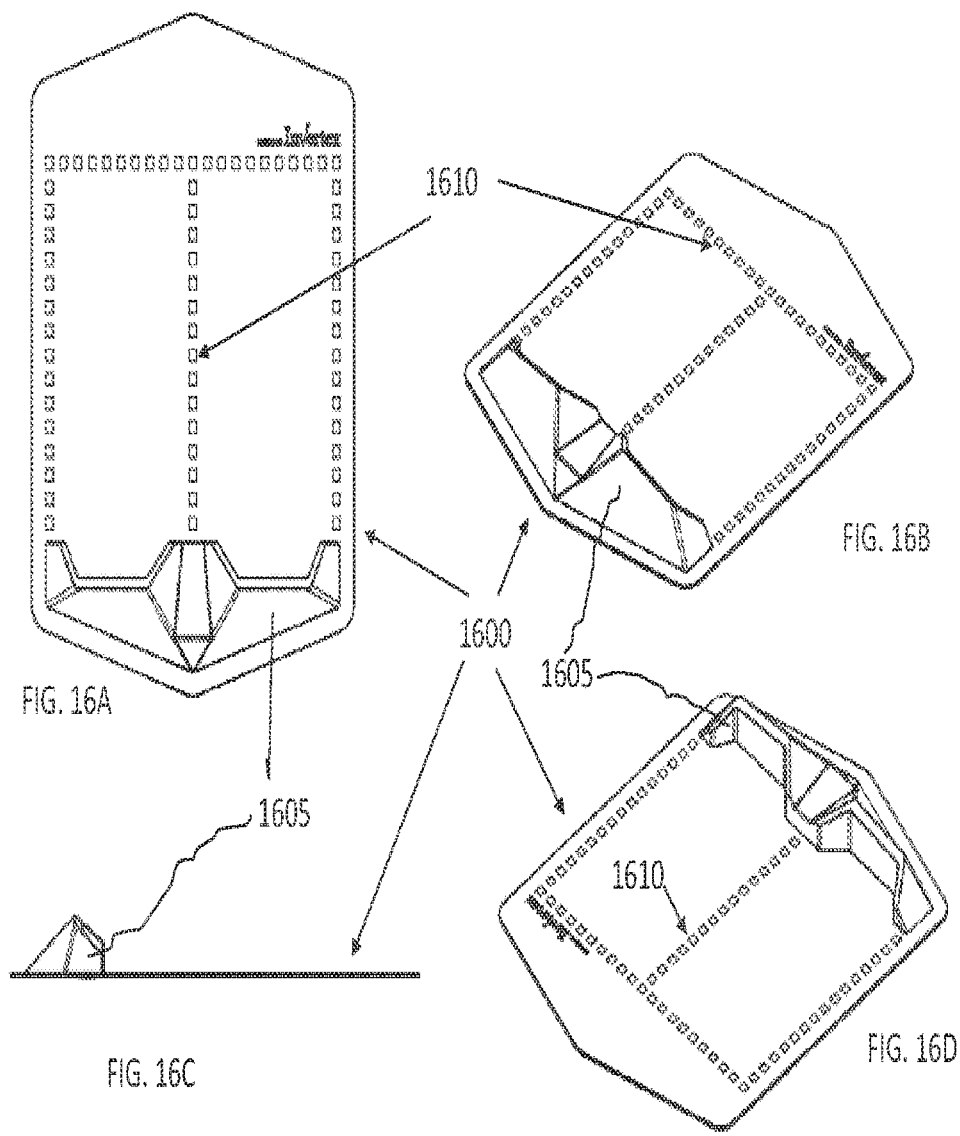

SYSTEM, PLATFORM AND METHOD FOR PERSONALIZED SHOPPING USING AN AUTOMATED SHOPPING ASSISTANT

CROSS-REFERENCE TO RELATED APPLICATIONS

This application is a U.S. National Stage application under 35 U.S.C. § 371 of the International Application PCT/US2018/039781 (published as WO 2019/005986 A1), filed Jun. 27, 2018, which claims priority to U.S. Provisional Application No. 62/525,454, filed Jun. 27, 2017, entitled "SYSTEM, PLATFORM AND METHOD FOR PERSONALIZED SHOPPING USING AN AUTOMATED SHOPPING ASSISTANT" the disclosures of which are hereby incorporated by reference in their entirety.

FIELD OF THE INVENTION

The present invention relates in general to methods, applications, and devices useful in personalized product shopping.

BACKGROUND OF THE INVENTION

A great majority of shoe shopping today still takes place in real bricks and mortar shops. Most customers are familiar with the limitations of conventional shopping, as are the shop managers and assistants. In general, customers are dependent on shopping assistants, to direct them towards products, location of in-stock products, assistance on trying on products etc.

Further, the typical shopping experience needs to repeated with substantially each visit of a customer to the same or a different shop, leading to great inefficiency and user frustration.

It would be highly advantageous to have a system or method that could allow highly accurate and user-friendly automated or semi-automated fitting solutions, both online and in store.

SUMMARY OF THE INVENTION

There is provided, in accordance with an embodiment of the present invention, an apparatus, system, and method to provide personalized online product fitting, according to some embodiments.

One embodiment of the invention includes a method for personalized shopping has the steps of an automated shopping assistant system accessing product data, a matchmaking system accessing user history data, the matchmaking system accessing user preference data, the matchmaking system accessing user anatomical data acquired from an automated shopping assistant apparatus, the automated shopping assistant system matching user history, preference and anatomical data with data to generate a personalized matching system.

In some embodiments, the automated shopping assistant system matches user history and preference data with product data, to generate personalized product recommendations.

In some embodiments, the automated shopping assistant system may be used to allow the user to order personalized products.

In some embodiments, the automated shopping assistant system may be used to providing a simulation that represents one or more anatomical characteristics of the user.

In an embodiment, the user and one or more third parties may provide product fitting feedback, and the user and one or more third parties may provide social feedback. The automated shopping assistant system may adjust the personalized product based on the product feedback. The system may also provide anatomical data about a user, wherein the automated shopping assistant system also considers the anatomical data to generate a user shopping avatar that contains one or more characteristics of the user.

In many embodiments, the automated shopping assistant system may include a virtual try-on feature. In an embodiment, before the user orders the personalized product, the product is generated based on the avatar. The user preferences may be selected from the group consisting of size, color, material, and type preferences.

According to sonic embodiments, a platform is provided for personalized shopping, including a cloud based server including a profile module for generating a digital avatar for multiple users, a product module for consolidating product data for multiple products, and a matchmaking module adapted to run code to match the digital avatar data and the product data, to generate product recommendations; an end user computing device, communicatively connected to the cloud based server, including an image capture element, wherein the matchmaking module runs a software application to generate a user mobile shopping avatar based on the capture of at least a part of the user anatomy, to be used in generating anatomical data for the digital avatar profile for a user.

In some embodiments, the platform is adapted to generate and/or present a simulation that represents one or more anatomical characteristics of the user.

In some embodiments, the platform may have a product ordering module, a product customization module, a social shopping module, and/or a product fitting module etc.

In another embodiment, a handheld system for personalized shopping may have a screen configured to receive a user's input, a device camera to capture standard images of a user anatomy, and a processor having registers adapted to analyze anatomical data, product data, user history data and user preference data, wherein the processor retrieves information from the registers, and writes information to the registers, is configured to match user history and preference data with product data to generate a personalized matching system, and the processor is configured to match user history and preference data with product data, to generate a personalized product, and wherein the user may purchase the personalized product by providing user input to the screen.

In one embodiment, the system has a depth sensor configured to accurately determine the distance of a subject from the sensor, and wherein depth sensor information is used to match preference data with product data. In some embodiments, the depth sensor is capable to provide a 3D scan of at least a part of a body that relates to an anatomical profile of a user, to allow capture of length, breadth, and depth of the part of the body.

In some embodiments, the handheld system includes a software application running on the handheld system, to generate and present a graphic simulation of a user mobile shopping profile based on the capture of at least a part of the user anatomy.

In yet another embodiment, A shopping assistant system for shopping using a shopping profile is provided, including a shopping assistant standing surface, for generating a 3D user shopping profile based on a capture of at least a part of a user's body by a camera device; a mobile device app for applying the user shopping profile in a store; a shopping assistant server connected to a shopping assistant database, based in a communications cloud; and multiple products tags for allowing the user to capture selected products.

In many embodiments, the shopping assistant system further includes one or more image scanners for capturing at least a part of a body that relates to an anatomical profile of a user, to allow capture of length, breadth, and depth of the part of the body.

In many embodiments, the shopping assistant standing surface includes one or more markings for assisting the capturing of body part dimensions.

In many embodiments, the shopping assistant standing surface includes one or more markings 3D elements for assisting the positioning of a body part to be scanned.

In many embodiments, the shopping assistant standing surface includes one or more pressure sensors for capturing a depth impression of at least a part of a body that relates to an anatomical profile of a user.

In many embodiments, the shopping assistant system includes an apparatus supporting one or more light sources for capturing a depth impression of at least a part of a body that relates to an anatomical profile of a user.

In many embodiments, the shopping assistant system further includes multiple product tags associated with multiple products, for a user to shop by scanning one or more product tags.

In many embodiments, the shopping assistant system further includes a proximity sensor associated with the shopping assistant apparatus, for identifying a user when the user enters a selected geographical zone around the shopping assistant apparatus.

In many embodiments, the shopping assistant system further includes a shopping profile for each of a plurality of users, for allowing a mobile device user shop for another user using the other user's shopping profile.

Still another embodiment of the invention includes a method for in-store shopping enhancement is provided, including identifying a user entering a shopping area, using a proximity sensor associated with a shopping assistant standing surface; positioning the user on the shopping assistant standing surface; opening a new or known user profile; initiating capture of at least a part of a body using one or more sensors; generating a user 3D shopping profile of the user; sending the user shopping profile to the user mobile device, where it is usable in a shopping assistant application; selecting a product of interest by the user, by scanning a product tab using the user mobile device; and providing the user with shopping assistance for the selected product.

In a variety of embodiments, the method further includes ordering a selected product using the user mobile device.

In a variety of embodiments, the method further includes customizing a selected product using the user mobile device.

In a variety of embodiments, the method further includes ordering a customized product using the user mobile device.

In a variety of embodiments, the method further includes providing the user product inventory information.

In a variety of embodiments, the method further includes fitting the selected product on the user shopping profile avatar.

In a variety of embodiments, the method further includes sending the fitted user profile avatar to a social media system for viewing by selected associated connected to the user.

In a variety of embodiments, the method of claim 10 further includes enhancing the user shopping profile based on the user behavior.

In a variety of embodiments, the method, further includes providing shopping recommendations based on the user shopping profile and/or user shopping behavior.

In a variety of embodiments, the method further includes using the user shopping profile for shopping in an online store.

In a variety of embodiments, the method further includes enhancing the user shopping profile using one or more capturing elements selected from the group consisting of a pressure sensor, image sensor, laser, and light sensor.

In a variety of embodiments, the method further includes adding additional user shopping profiles to a mobile device.

In a variety of embodiments, the method further includes converting a user's profile from an in-store apparatus to a user mobile device.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein:

FIGS. 8B-8H show a set of views of an example of a shopping assistant apparatus, according to some embodiments;

FIGS. 13A-13B are examples of screenshots showing an interactive guide on the shopping assistant screen or mobile screen, for helping the user to define their profile, and their contact information, according to some embodiments;

FIGS. 16A-16D show a set of views of an example of a shopping assistant standing surface, according to some embodiments;

DETAILED DESCRIPTION OF THE INVENTION

The following description is presented to allow one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The term "fitting" as used herein refers to trying on a product, seeing a product tried on, modifying the product to a particular person's body, and/or other physical parameters. The term "avatar" refers to an embodiment, personification, icon, model, or figure representing a particular person, in particular, to represent a person on screen.

The relatively low rate of footwear purchases online shopping may be increased by providing an accurate size recommendation to the customer, optionally based on a simulation or avatar model of a customer's feet, for each shoe model, leading to higher customer confidence in the purchase.

Non-limiting embodiments of the present invention include a system, platform, and method for facilitating highly personalized shopping, whether online and/or in-store, including effective fitting-on of products. In some embodiments, systems, platforms, and methods are provided for allowing personalized manufacturing of product.

Figure 1A:
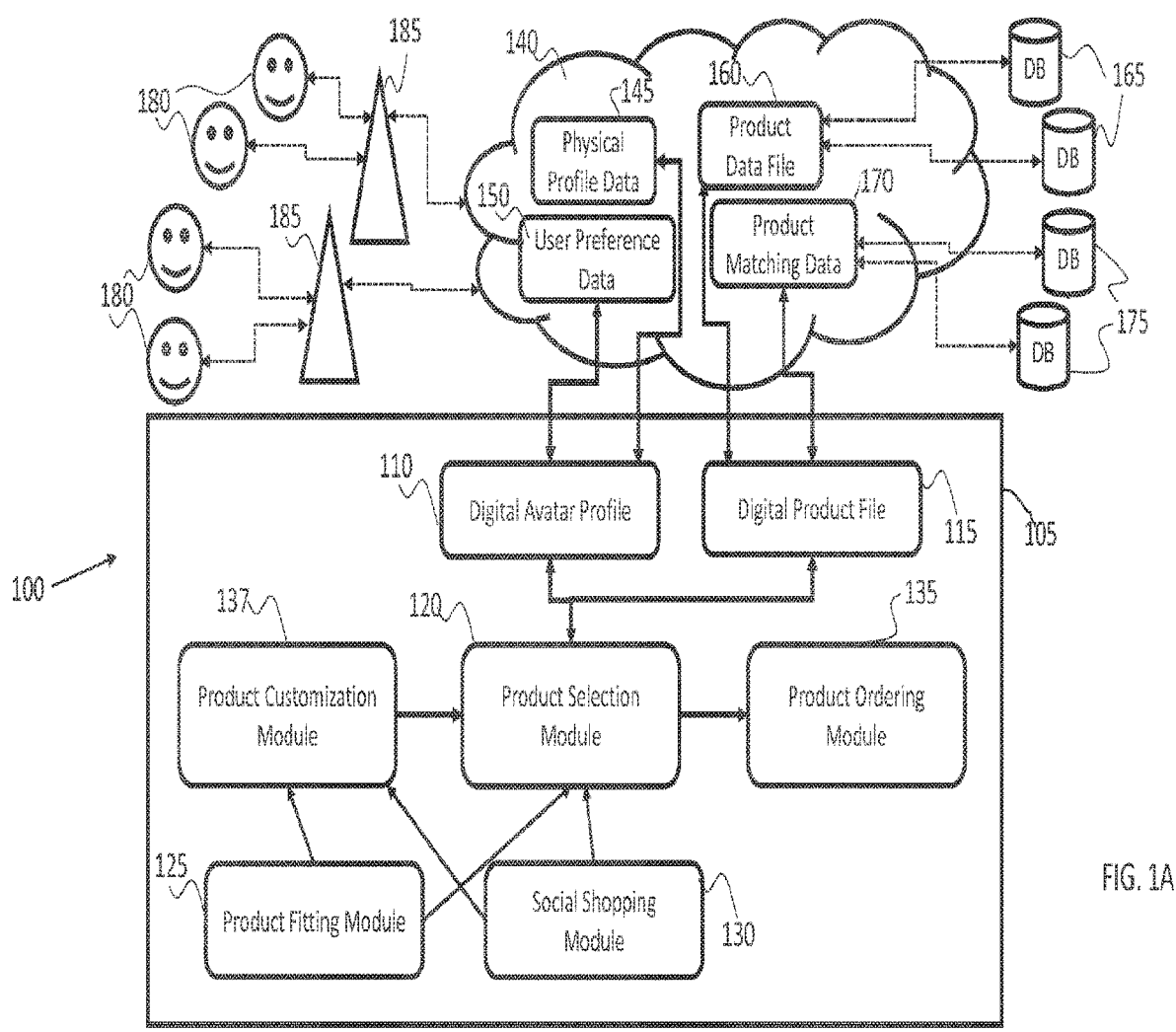
FIG. 1A is a schematic system diagram depicting a system for facilitating personalized shopping, according to some embodiments.

Reference is now made to FIG. 1A, which is a schematic system diagram depicting a system 100 for facilitating personalized shopping, according to some embodiments. System 100 allows seamless shopping in store and/or online, using a highly accurate user shopping profile and/or avatar, generated by an automated shopping assistant apparatus. In some cases, data processing is performed on the cloud and/or on the local automated shopping assistant apparatus.

As can be seen, personalized shopping system 100 includes a platform 105 for personalized shopping profile management, which may include a digital avatar profile module 110, a digital product file module 115, a product selection module 120, a product fitting module 125, a social shopping module 130, a product ordering module 135, and a product customization module 137.

Platform 105 is in communication with communications cloud 140, which may include physical profile data module 145, communicatively connected to launch pad, kiosk, or automated shopping assistant apparatus 185, which is further connected communicatively to users 180, providing physical user data, for example, from 2D and/or 3D scans or other digital measurement sources. Communications cloud 140 may further include user preference data module 150, communicatively connected to automated shopping assistant apparatus 185, and/or to 180, providing user preference data. Communications cloud 140 may further include product file data module 160, communicatively connected to product databases 165, and product matching data module 170 containing product matching algorithms, communicatively connected to product databases 175.

In one embodiment, apparatus 185 includes one or more imaging devices, such as 2D and/or 3D cameras, that may be moving or static components. Apparatus 185 may further include one or more sensors, for example, a proximity sensor, scanner, camera, pressure plate, and/or other sensors.

As can be seen, digital avatar profile 110 is highly personalized, constructed from various data sources, whether directly or indirectly from a user, and whether representing physical characteristics and/or mental, emotional, psychological characteristics. Digital avatar profile 120 generally includes a file or group of files and data points from which instructions can be executed to allow the generation of a high-resolution user profile or avatar from one or more data sources. Further, product selection module 120 generally matches up personalized avatar profile 110 with selected digital products, whether online or offline. In some embodiments, one or more device registers may be used, wherein the register(s) refers to one of a small set of data holding places that are part of a computer processor, for holding a computer instruction, a storage address, or any kind of data. The matching algorithm, in some embodiments, may include running code to provide perfect or close to perfect matches between product types, sizes, styles, models, etc. provided by a product database, and the physical parameters and/or user preference data as defined by the user avatar profile, based at least on a scan of at least a part of the user's body that relates to the user's profile. For example, user A can have a foot profile that is defined by a size, width, and depth. Further, the user's profile may include preference data such as preferred styles, shoe types, models, and colors, such as a blue or grey athletic shoe, The product database may include, for example, an athletic shoe is colors blue, grey, and blue-grey, in the precise or close enough to the user's size, width, and depth. In this case, the matching algorithm will match the profile definitions with the one or more products from the product database that match the user profile.

Product selection module 120 may be further refined by providing system feedback and product fitting data using product fitting module 125, as well as social shopping data from social shopping module 130. Product fitting module 125, in some embodiments, includes a means for feedback from a shopping assistant or supporter that is with the shopper. In other embodiments, product fitting module includes a means for feedback from a virtual shopping assistant or supporter, for example, a communicatively connected supporter, a digital or virtual mirror or screen showing the user with the product. Further, product customization module 137 may receive data from product fitting module 125 and/or social shopping module 130, to help further personalize the product being considered for acquisition in accordance with the digital avatar and the product fitting module 125 and/or social shopping module 130. Product customization module 137 may allow a user to change or customize the product being tried on or tested, for example, by changing product colors, shape, design, size, materials etc. In this way, the product to be ordered may be constructed in accordance with user specific or customized requirements. Further, the product customization module 137 may send to the product selection module 120 the customized product as chosen or generated by the user, after which the product selection module 120 may initiate the ordering of the customized product, via the product ordering module 135. Moreover, user updates embodied in the user's changes made in product selection module 120 may be used to update the digital avatar profile 110, thereby keeping the user avatar profile updated, for example, to user body changes, preference changes, etc.

Product selection module 120 includes a file or group of files and data points from which instructions can be executed to execute commands to allow the matching of high-resolution user profiles or avatars to products that have a high level of fit to the shopping research being performed by each system user. This module may further integrate the feedback generated in the system modules to constantly improve the accurate product recommendation it provides. Using a variety of technical procedures that are performed on the avatar, such as integrating volume, cross section area and circumferences as well as length, width, height and additional distances, the system may represent the avatar in an array of representing numbers. This array of numbers, in some embodiments, may represent the various elements of the avatar, to allow for comparison to similar elements of the products to be tried on by the avatar. Accordingly, when the avatar data which may be enhanced using recommendation algorithms and machine learning techniques etc., is compared to the product data from the product file, this may allow for an accurate, constantly improving, personalized product recommendation from the system.

According to some embodiment, digital avatar profile can be generated with relatively low-level integration of 3D scanners. In some examples, sensors or scanners that may be used may include structured light, time-of-light, photogrammetry, or any other type of 3D and/or 2D scanning technology. A variety of sensors and scanners, include, but are not limited to, are PrimeSense based scanners, Occipital Structure Sensors, 3D-Systems Sense and iSense sensors, Intel Real Sense sensors (stand alone or machine integrated), scanning platforms provided on mobile devices such as cellular telephones or tablet devices, personal computers, etc.

Figure 1B:
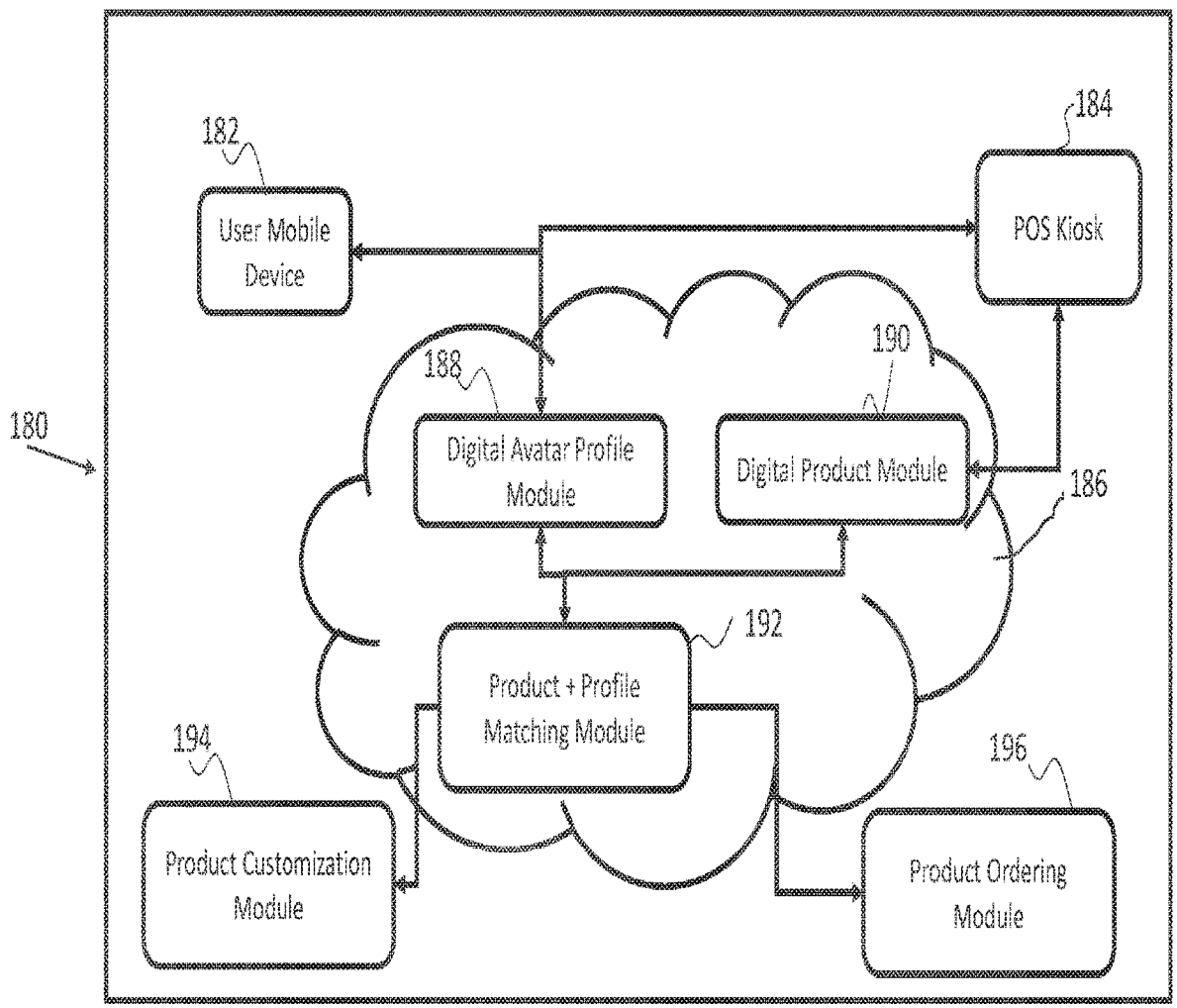
FIG. 1B is a schematic system diagram depicting a platform for facilitating personalized shopping, according to some embodiments.

Reference is now made to FIG. 1B, which is a schematic system diagram depicting a platform 180 for facilitating personalized shopping, according to some embodiments. As can be seen, personalized shopping platform 180 includes one or more user mobile devices 182, such as smartphones or tablets, including, without limitation, a camera, application and data connectivity; a shop or point of sale computing device, kiosk or automated shopping assistant apparatus 184, typically at or near a shop, for example an electronic device with a one or more cameras, sensors or scanning devices, application, and data connectivity; where mobile device(s) 182 and or automated shopping assistant apparatus 185 connect to the communications cloud 186. Communications cloud 186 includes a digital product module 190, for holding, consolidating and otherwise managing data for multiple products; a digital avatar profile module 188, for holding, consolidating, processing, and otherwise managing profile data for multiple users; and matching module 192, for matching product and avatar profile data, to assist in allowing product recommendations and other matching functions. Platform 180 further includes a product customization module 194, for allowing ordering of customized products based on matching module output and or user choices; and product ordering module 196, for allowing ordering of products based on the based on matching module output and or user choices.

Figure 2:
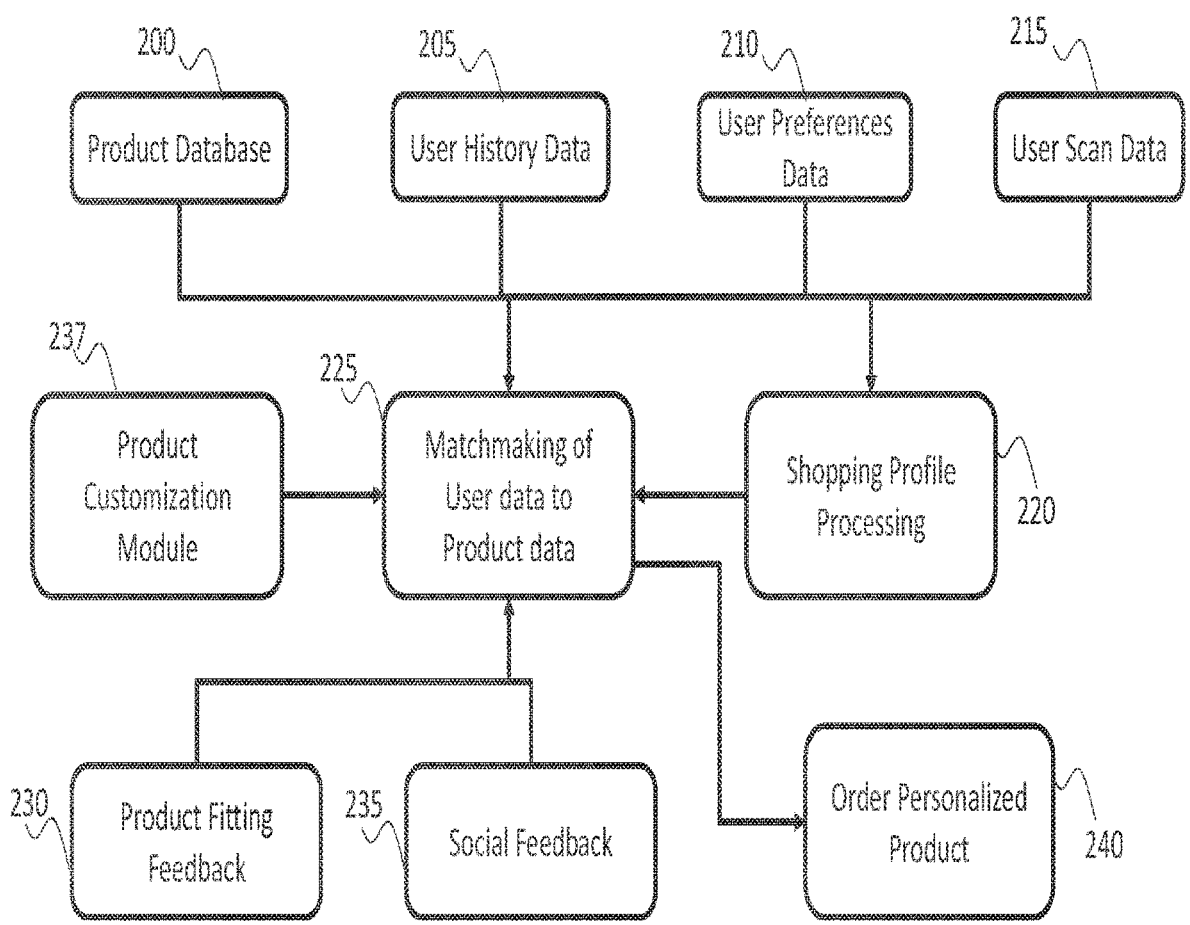
FIG. 2 is a flow diagram indicating a process of facilitating personalized shopping, according to some embodiments.

Reference is now made to FIG. 2, which is a is a flow diagram indicating a process of facilitating personalized shopping, whether online or offline, according to some embodiments. As can be seen, product information from a product database 200 may be used for products to be discovered, purchased, or manufactured. At step 205 history data for a user may be retrieved, for example, based upon previous user purchases and research. At step 210 user preference data may be acquired, such as size, color, material, type preferences etc. At step 215, scanned or graphic data may be acquired for a user, for example, from standard photographs, 2D and/or 3D image scanning, or from capture and processing using a POS kiosk or automated shopping assistant apparatus etc. This graphic data is used by the personalized shopping system to generate a user's physical profile based on the user's physical properties. At step 220 a multi-dimensional user shopping profile, hereinafter referred to as a user shopping avatar, may be developed, by processing the various input data from steps 205, 210 and 215, thereby generating a user shopping avatar or profile that includes user physical properties as well as user behavior and user preference data. The profile or avatar is a dynamic structure that may constantly improve in the way it animates, reflects, or represents the user, optionally using feedback and additional inputs from steps 205, 210, and/or 215. In one implementation, a user avatar may be used to match a user to potential products, in a single store, and/or in multiple stores, for example, in any retail store in a chain of stores, or online, in a network or affiliation of online and/or offline stores or platforms.

At step 225, a matchmaking of the user shopping profile to products being researched or required is executed. At this step, the product data from product database 200 is matched to products being researched by a user, in accordance to the specific user shopping profile, thereby allowing advanced filtering out of non-appropriate products for the specific user, and the advanced matching up of appropriate products, in accordance with the specific user's personal shopping profile and preferences. The step of matching may be complemented by a provision of recommendations for the user, based on the user profile to product matchmaking process.

At step 230 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. In some cases, advanced graphic processing and 3D rendering may be used for the user to virtually try on the product being researched, such that the users may see themselves dressed in the product in accordance with a digital simulation that places the product onto the user shopping avatar. In a variety of embodiments, a model is dynamically generated based on the product fitting data and/or user profile and augmented by modifying the generated model to incorporate the model of the product being tried on. This model can then be displayed using any of a variety of devices described herein, thereby allowing the customer to preview the products. In some cases, the system may provide a static or dynamic high-resolution visual output such as an animated avatar or character, rendered pictures and/or visual representation of the recommendation, optionally fitted on the avatar. For example, such a rendition may allow the user to see the product being tried on to be depicted on the avatar, thereby helping the user to visualize details such as fit, tightness, color, style, material, models, etc., according to color heat maps etc. For example, color heat maps may be used to indicate areas of tightness, tension, friction etc. when the product interfaces with the body. As described herein, the user may use the shopping avatar to provider further feedback to modify the user's shopping profile. At step 235 feedback may be acquired from social networks or direct third party feedback to which a user is connected, to help modify the user shopping profile.

At step 237, product customization may integrate data from product fitting feedback at step 230 and/or social feedback at step 235, to help further personalize the product being considered for acquisition in accordance with the digital avatar and the product fitting module 125 and/or social shopping module 130.

At step 240, a personalized product may be ordered by a user, whether inside a physical store or an online store. Further, a personalized product may be ordered from a manufacturer who may produce a product based upon the user's request such that the product is a once-off customized product for a user. The custom products may include, for example, various types of customization including material type, print samples, color, size, volume, angles, model variation, styles, personal tailoring, etc.

Figure 3:
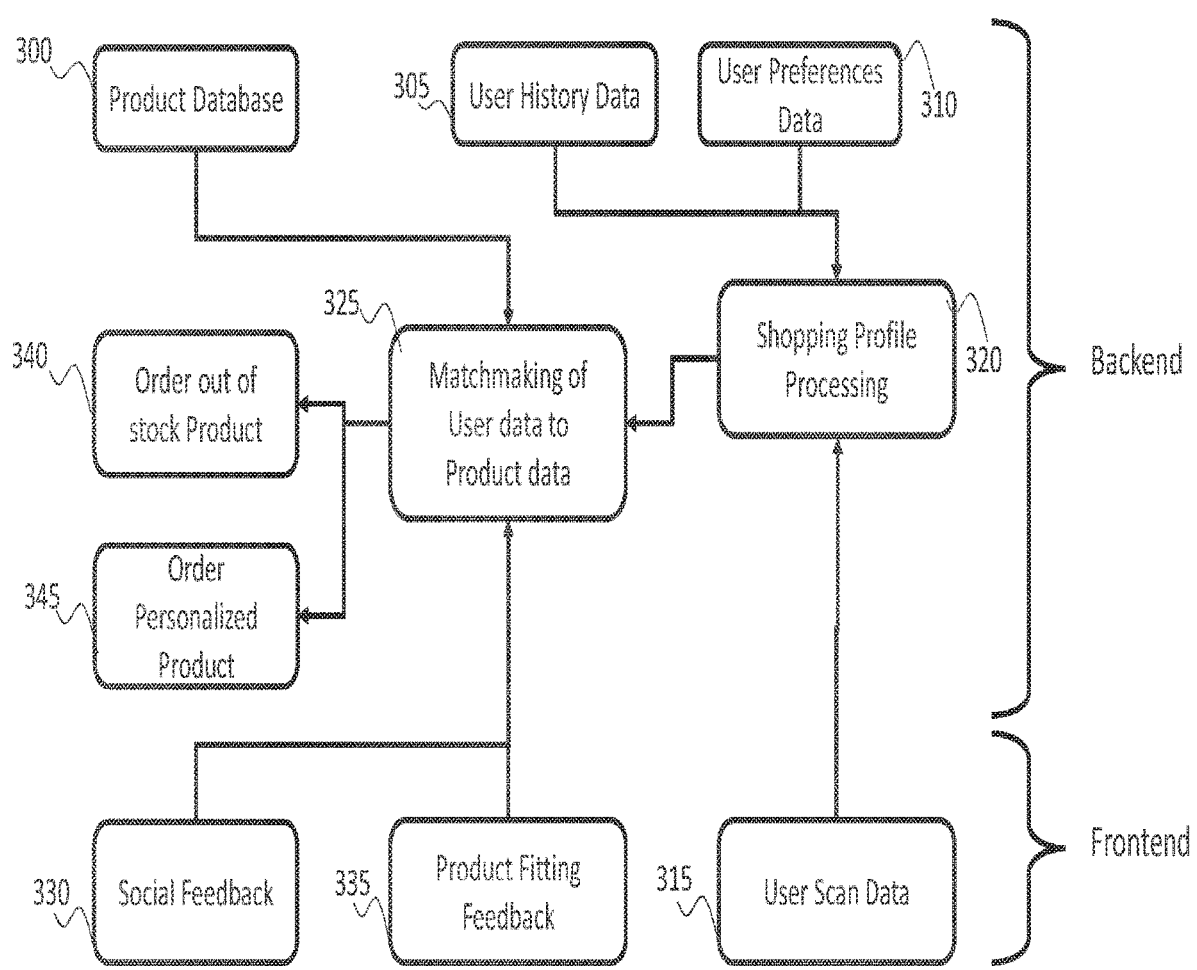
FIG. 3 is a flow diagram for facilitating a personalized in-store shopping experience, according to some embodiments.

Reference is now made to FIG. 3, which is a flow diagram for facilitating a personalized offline (in the store) shopping experience, according to some embodiments. As can be seen, at the backend or computing system supporting a physical store, product information from a product database 300 may be used for products to be discovered, purchased, or manufactured by an online user. In some embodiments, product database is associated with a product data processing module, which is adapted to perform high intensity calculations on the local point-of-sale device and/or on the cloud, depending on the embodiment type and requirements. At step 305 history data for a user may be retrieved, for example, based upon previous user purchases in a store or chain of stores. At step 310 user preference data may be acquired, such as size, color, material, type preferences etc. At step 315, at the frontend or user side, scanned or graphic data may be acquired for a user, for example, from standard photographs, 2D and/or 3D image scanning, or from capture and processing using a POS kiosk or apparatus etc. In some embodiments, a dedicated or generic application on a smart phone, tablet, or other computing device may be used to allow effective photographing or scanning of a user. In further embodiments a dedicated or generic camera or scanning device, kiosk or standing station (moving or static) may be used by a shopping assistant, helper, and/or salesperson. At step 320, this geometrical data is used by the personalized shopping system, together with the various input data from steps 305 and 310, to generate a multidimensional user shopping avatar or profile that includes user physical properties as well as user behavior and user preference data.

At step 325, a matchmaking of the user shopping profile to products being researched or required is executed. At this step, the product data from product database 300 is matched to products being requested by a user, in accordance to the specific user shopping profile. The step of matching may be complemented by a provision of recommendations for the user, based on the user profile to product matchmaking process, thereby allowing advanced filtering out of non-appropriate products for the specific user, and the advanced matching up of appropriate products, in accordance with the specific user's personal shopping profile and preferences. This advanced filtering allows a shop salesperson, for example, or the user themselves, to be presented with substantially appropriate products, optionally products that are currently available, rather than have the user select items that are non-appropriate, thereby wasting time and resources of shopping assistants and the shopper themselves. This also allows for users to benefit from matching and recommendation data, which was generated for other avatars or users, which may share similar features, optionally in an anonymized manner, thus allowing a smarter and more accurate matching and/or recommendations.

At step 330 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person, what model of shoes looks best on the person, and/or which size looks best etc., may be used by the user to update their shopping profile. At step 335 feedback may be acquired from the users, using an active and/or passive approach. For example, active entry of feedback may occur when the system receives actual feedback about the fit (e.g., good/bad/off by how much) or other aspects, whether from a present person or people and/or a remote person or people. Such feedback may allow a user to, for example, enter selected choices into the system, for example, via a box or text entry element where the user may enter a selected size, model, type and/or other preference. Passive feedback may occur when the system receives actual feedback about the fit or other aspects originating from sales information, returns, etc., or by trying on certain types, colors, models, sizes etc., allowing the system to learn from the user's past choices and behavior to further improve the personal avatar as well as the product information and fit for other users. In some cases, advanced graphic processing and 3D rendering may be used for the user to try on the product being researched, such that the user may see themselves virtually dressed in the product in accordance with a digital simulation that places the product onto the user shopping avatar. The user may use the shopping avatar to provider further feedback to modify the user's shopping profile.

At step 340, a personalized product may be ordered by a user from a physical store, for example, for a product that is in principle available but not currently in the store, or to allow manufacturing of a specifically required product based upon the user's shopping avatar, such that the product is a customized product for a user.

At step 345, the user can select a personalized product and/or modify or design a product, optionally based on a product that the user has seen, liked, and/or chosen in the store, to purchase a custom product that will be created and/or manufactured for her/him. These modifications may include visual changes, such as name engraving, colors, materials, prints etc., as well as physical properties, such as controlling the height of the heels in shoes, the thickness of a frame in eyewear etc. At steps 340 and 345, these features may allow the in-store customers to enjoy features that are typically limited to e-commerce and online shopping.

Figure 4:
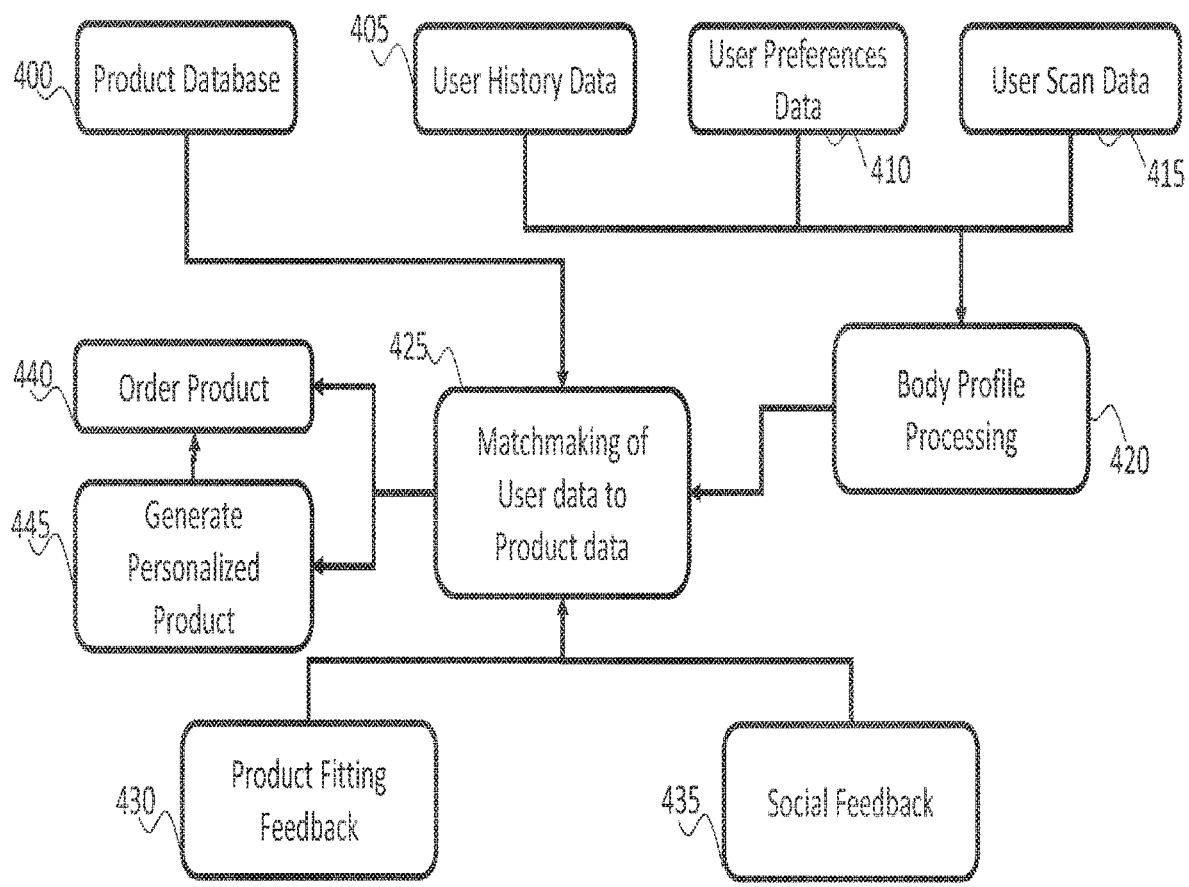
FIG. 4 is a flow diagram for facilitating a personalized online shopping experience, according to some embodiments.

Reference is now made to FIG. 4, which is a flow diagram for facilitating a personalized online shopping experience, according to some embodiments. As can be seen, an online store may acquire product information from a product database 400, for a selection of products to be offered to online users. At step 405 history data for an online user may be retrieved, for example, based upon previous user purchases and research. At step 410 user preference data may be acquired, such as size, color, material, type preferences etc. At step 415, scanned or graphic data may be acquired for a user, for example, from standard photographs, 2D and/or 3D image scanning, or from capture and processing using a POS kiosk or apparatus etc. In some embodiments, a dedicated or generic application on a smart phone, tablet, or other computing device may be used to allow effective photographing or scanning of a user. In other embodiments a webcam, 3D camera, video recorder etc. may be used to acquire scanned or graphic data. At step 420, this graphic data is used by the personalized shopping system, together with the various input data from steps 405, 410 and 415, to generate a multidimensional user shopping avatar or profile that includes user physical properties as well as user behavior and user preference data.

At step 425, a matchmaking of the user shopping profile to products being researched or required is executed. At this step, the product data from product database 400 is matched to products being researched by a user, in accordance to the specific user shopping profile, thereby allowing advanced recommending of product matches, for example, to aid filtering out of non-appropriate products for the specific user, and the advanced matching up of appropriate products, in accordance with the specific user's personal shopping profile and preferences.

At step 430 product fitting data from feedback of remote people, such as family members, friends or shopping assistants connected via a smart phone or computer for example, may be used to help modify the matchmaking of user data to product data, for example, to include data relating to which colors look good on a person or which size looks best etc. may be used by the user to update their shopping profile. In further examples, code may be used to provide product color recommendations, size or fit recommendations etc. This feedback may be collected actively from the user or statically, for example based on the purchase information, shipping data, etc. At step 435 feedback may be acquired from social networks or to which a user is connected, to help modify the user shopping profile. In addition, a human and/or machine based digital representative, style expert, and/or additional guiding information may be inputted to improve the guidance and support provided to the shopper in the online purchase process. In some cases, advanced graphic processing and 3D rendering may be used to allow the user to virtually try on the product being researched, such that the user may see themselves dressed in the product in accordance with a digital simulation that places the product onto the user shopping avatar. This may be done using real-time simulation, allowing for a live stream of animated video or high resolution images of the simulation etc. The "digital try-on," in some embodiments, may include a physics simulation to include the exact positioning of the element on the avatar in movement on in a static position. As described herein, the user may use the shopping avatar to provider further feedback to modify the user's shopping profile.

At step 440, a product may be ordered by a user from an online store. Optionally, at step 445, a personalized product may be generated by a user from an online store, to allow manufacturing of a specifically required product based upon the user's shopping avatar, such that the product is a one-off customized product for a user. The shopping system, in case of a custom manufacturing output, may if needed, connect directly to the company production hardware and ERP system to facilitate such personalized product manufacturing. In one example, the personalized product may be represented in 3D printer files such as STL models or digital cutting devices, such as DXF or DWG files. In other embodiments, this could be a custom routing card or production instruction and BOM files. Additional input may include be visual renders that will help a product manufacturer or printer to visually design the custom product.

In some embodiments, the data from product database 400 may be used, together with the body or avatar profile derived in step 420, to develop a customized product at step 445, optionally without product matchmaking at step 425.

Figure 5:
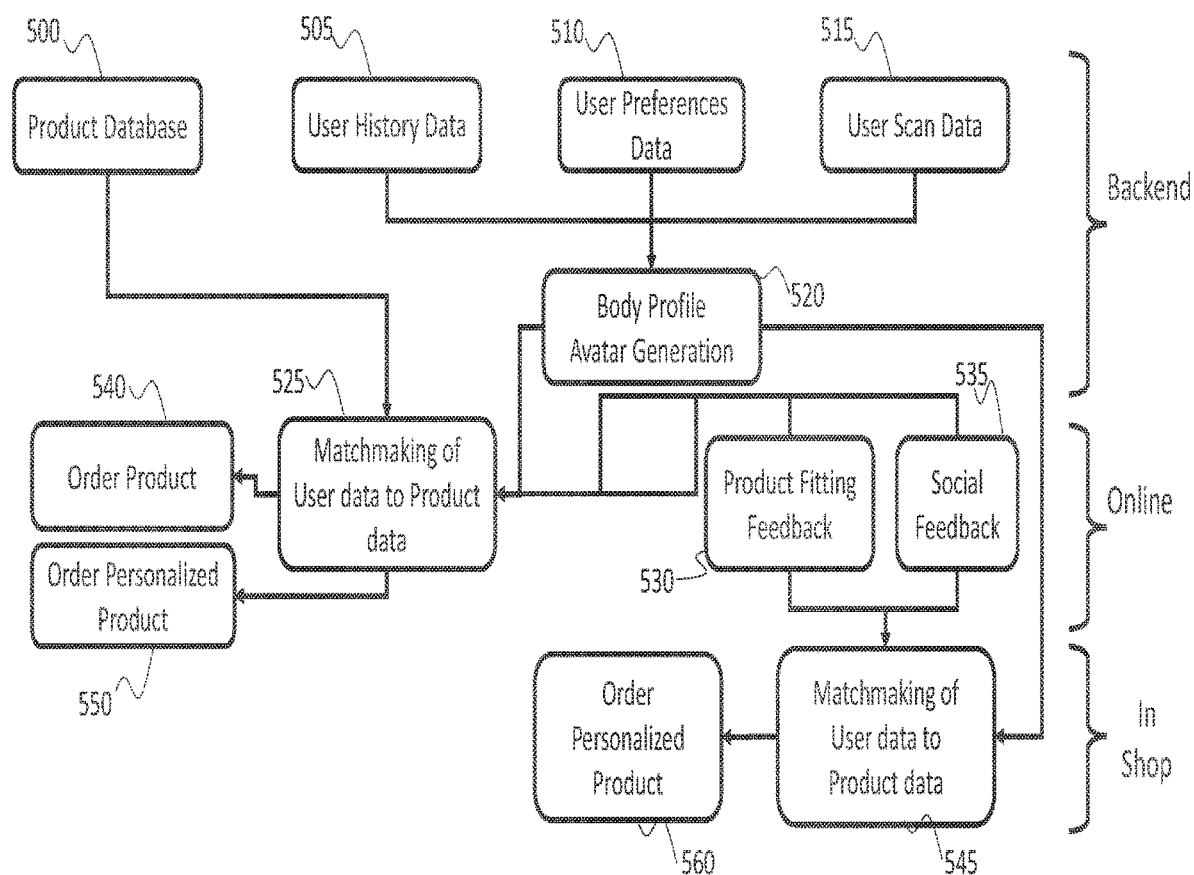
FIG. 5 is a flow diagram indicating an example of personalized hybrid shopping experience, according to some embodiments.

Reference is now made to FIG. 5, which is a flow diagram indicating an example of personalized hybrid shopping experience, according to some embodiments. As can be seen in the figure, at the backend or computing system supporting a physical and/or online store, product information from a product database 500 may be used for products to be discovered, purchased, or manufactured by an online or in store user. At step 505 history data for a user may be retrieved, for example, based upon previous user purchases in a store or chain of stores, whether from online and/or in store experiences. At step 510 user preference data may be acquired, such as size, color, material, type preferences etc. At step 515, at the frontend or user side, whether executed by the user or by a shopping assistant, scanned, or graphic data may be acquired for a user, for example, from standard photographs, 2D and/or 3D scanning, or from capture and processing using a POS kiosk etc. In some embodiments, a dedicated or generic application on a smart phone, tablet, or other computing device may be used to allow effective photographing or scanning of a user. In further embodiments, a dedicated or generic camera or scanning device may be used by a shopping assistant, which may include portable or non-portable devices, kiosk type or stand-alone devices. At step 520, this graphic data is used by the personalized shopping system, together with the various input data from steps 505, 510 and 515, to generate a multidimensional user shopping avatar or profile that includes user physical properties as well as user behavior and user preference data. One advantage of this system is the seamless transfer in which the users can transition between online and offline shopping, while enjoying the benefits of personalization, using a constantly updated personal profile in the online and/or in-store scenarios.

In some embodiments, at step 525, a matchmaking of the user shopping profile to products being researched or required is executed, for an online shopping optionally located in a physical store. At this step, the product data from product database 500 is matched to products being requested by a user, in accordance to the specific user shopping profile, thereby allowing advanced filtering out of non-appropriate products for the specific user, and the advanced matching up of appropriate products, in accordance with the specific user's personal shopping profile and preferences. This advanced filtering allows a shop salesperson, for example, or the user themselves, to be presented with substantially appropriate products, optionally products that are currently available, rather than have the user select items that are non-appropriate, thereby wasting time and resources of shopping assistants and/or the shopper themselves.

At step 530 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. At step 535 feedback may be acquired from social networks or to which a user is connected, to help modify the user shopping profile. In some cases, advanced graphic processing and 3D rendering may be used for the user to virtually try on the product being researched, such that the user may see themselves dressed in the product in accordance with a digital simulation that places the product onto the user shopping avatar. As described herein, the user may use the shopping avatar to provider further feedback to modify the user's shopping profile.

At step 540, a product may be ordered by an online user in a physical store. At step 550, a personalized product may be ordered by an online user in a physical store, for example, for a product that is in principle available but not currently in the store, or to allow manufacturing of a specifically required product based upon the user's shopping avatar, such that the product is a customized product for a user.

In some embodiments, at step 545, a matchmaking of the user shopping profile to products being researched or required is executed, for user located in a physical store. At this step, the product data from product database 500 is matched to products being requested by a user, in accordance to the specific user shopping profile, thereby allowing advanced filtering out of inappropriate products for the specific user, and the advanced matching up of appropriate products, in accordance with the specific user's personal shopping profile and preferences. This advanced filtering allows a shop salesperson, for example, or the user themselves, to be presented with substantially appropriate products, optionally products that are currently available, rather than have the user select items that are inappropriate, thereby wasting time and resources of shopping assistants and/or the shopper themselves.

Figure 6:
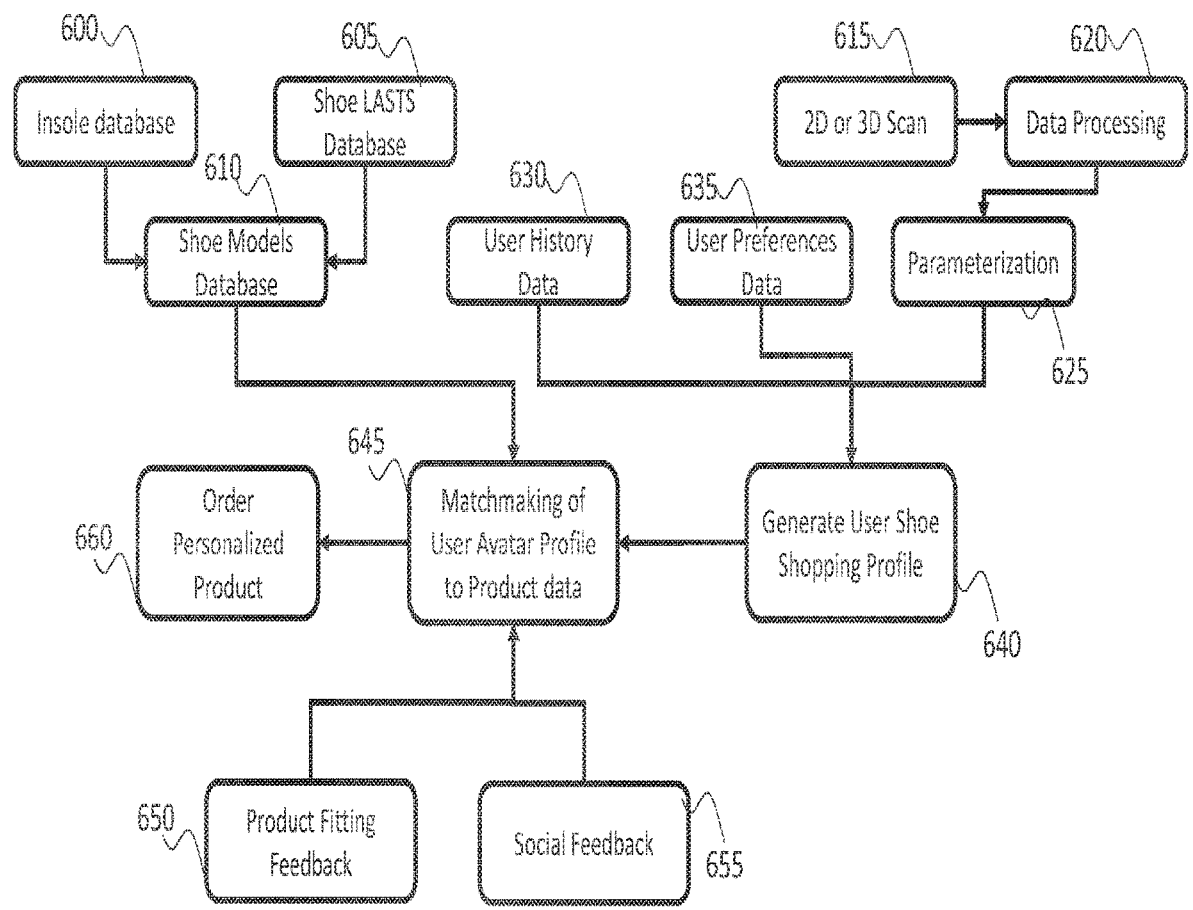
FIG. 6 is a flow diagram indicating an example of personalized shoes shopping, online or offline, according to some embodiments.

Reference is now made to FIG. 6, which is a flow diagram indicating an example of personalized shoes shopping, online or offline, according to some embodiments. As can be seen in the figure, insole information from an insoles product database may be acquired at 600. In addition, shoe last information from shoe lasts product database may be acquired at 605. In some cases, inner sole data, shoe last data and/or shoe model data may include data about each product's shape, volume, materials of shoes, closure type, shoe type, width, length, height, thickness, elasticity of materials, comfort fit etc. In some examples, mesh analysis and digitization may be provided, for example, to run a mesh analysis of each 3D last, combined with 2D DXF data, to be added to shoe last database 605. In addition, shoe model data for shoes to be discovered, purchased, or manufactured may be acquired from shoe models database 610. In some cases, for example, 3D Sit files may be imported for shoe lasts, and 2D DXF files may be imported for last bottoms.

At step 615, scanned or geometrical data may be acquired for a user, for example, from standard photographs, 2D and/or 3D image scanning, or from capture and processing using an automated shopping assistant apparatus etc. This graphic data may be processed at 620, by the personalized shopping system, over the cloud or in the unit itself, in order to generate a user's physical profile based on the user's physical properties. The profile may include all or some of the following attributes: a 3D mesh including the exact geometry of the profile, a 3D mesh including the exact geometry of one or more parts of the user's body, 2D images, properties calculated from one or more of the input methods, including specific volumes, cross section measurements, specific distances and lengths, as well as non-numeric attributes such as preferences etc. For example, a user's foot or both feet together may be pictured or scanned while standing on the floor or on another other surface, on or near a reference object, etc. Further, the user's foot or feet may be scanned by the camera scanning around the different angles of the feet, or by the person moving around the camera, thereby generating a 3D model, a movie, or a set of images as reference. The scanned data may typically be processed, optionally including interpolation and/or cleaning, to allow for object identification and mesh generation, or other suitable processing means. In some cases, meshing may further allow removal of excess geometries and/or fixing of mesh errors, for example, including separation, identification, and preparation of each of the feet, removal of the floor, pants or other excess materials from the scans etc. Scanned data processing may, in some cases, allow for feet alignment, which also helps separation or individualization of the two feet, to provide accurate measurement of both feet, including dimensional analysis to determine general and area specific lengths, width and height, and Cross sectional analysis to determine area, perimeter, and other dimensions at specific cross sections. Scanned data processing may allow for smoothing of the edges of the scanned feet, building of missing volumes, constructing of the soles of the feet etc. In some cases, full foot volume and/or area specific volume may be extracted from the model as additional information. At step 625, the processed user scanned data may be parameterized, for example, to extract precise length, width, height, arch, ball, cross section, circumferences, volume dimensions, etc. These parameters may be calculated off the clean 3D mesh using specific algorithms. For example, the calculation of the foot arch height off a model that was scanned in the standing position is complex and may be based on comparison of XYZ parameters of various anatomical parts throughout different cross sections in the center of the foot. The width of the foot may be calculated based on the volume of the toe box calculated both at a 3D mesh and/or 2D cross section level as appropriate to the requirements of specific applications of embodiments of the invention. The length of the foot may be calculated from a combination of the total length and the "ball length" which represents the distance between the heel of the foot and the first metatarsal. In addition, user specific conditions, such as sores, infections, damage etc. can also be identified and integrated into the user's shoe shopping profile. At this step, the pronation or supination condition of the foot may also be analyzed. Additionally, the arch of the foot may be identified and measured for fitting of support insoles or other prosthetics.

At step 630 history data for a user may be retrieved, for example, based upon previous user purchases in a store or chain of stores, whether from online and/or in store experiences. At step 635 user preference data may be acquired, such as size, color, material, type preferences etc. At step 640 a multi-dimensional user shoe shopping profile, hereinafter referred to as a user shopping avatar, may be created, by processing the various input data from steps 615, 620, 625, 630 and 635, thereby generating a user shoe shopping avatar or profile that includes user physical properties as well as user behavior and user preference data. In some embodiments, the user shoe shopping profile includes both feet of the user, which are typically different and for which parameters are determined individually, thereby benefitting from individual profiles for left and right feet.

At step 645, a matchmaking of the user shoe shopping profile to shoe products being examined, researched, or required is executed. At this step, the product data including dimensions, from product databases 600, 605 and 610 is matched to products being researched by a user, in accordance to the specific user shopping profile, thereby allowing advanced filtering out of inappropriate products for the specific user, and the advanced matching up of appropriate products, in accordance with the specific user's personal shopping profile and preferences. The step of matching may be complemented by a provision of recommendations for the user, based on the profile to the user's matchmaking process. This step may use the models of the foot and shoe digital profiles directly, and/or the parametrized numeric model.

At step 650 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. In some cases, advanced graphic processing and 3D rendering may be used for the user to try on the product being researched, such that the user may see themselves virtually dressed in the product in accordance with a digital simulation that places the product onto the user shopping avatar. In a variety of embodiments, a model is dynamically generated based on the product fitting data and/or user profile and augmented by modifying the generated model to incorporate the model of the product being tried on. This model can then be displayed using any of a variety of devices described herein, thereby allowing the customer to preview the products. As described herein, the user may use the shopping avatar to provider further feedback to modify the user's shopping profile. At step 655 feedback may be acquired from social networks to which a user is connected, to help modify the user shopping profile.

At step 660, a personalized pair of shoes may be ordered by a user, whether inside a physical store or in an online store. Further, a personalized product may be ordered from a manufacturer who may produce a product based upon the user's request such that the product is a once-off customized product for a user. Customized footwear based on this invention may be customized and/or personalized, for example, in of one or more of the following ways: shape (e.g., size, length, geometry, and/or volume), design (e.g., colors, patterns, print, and/or materials) or any other specification or combination of the above.

Figure 7:
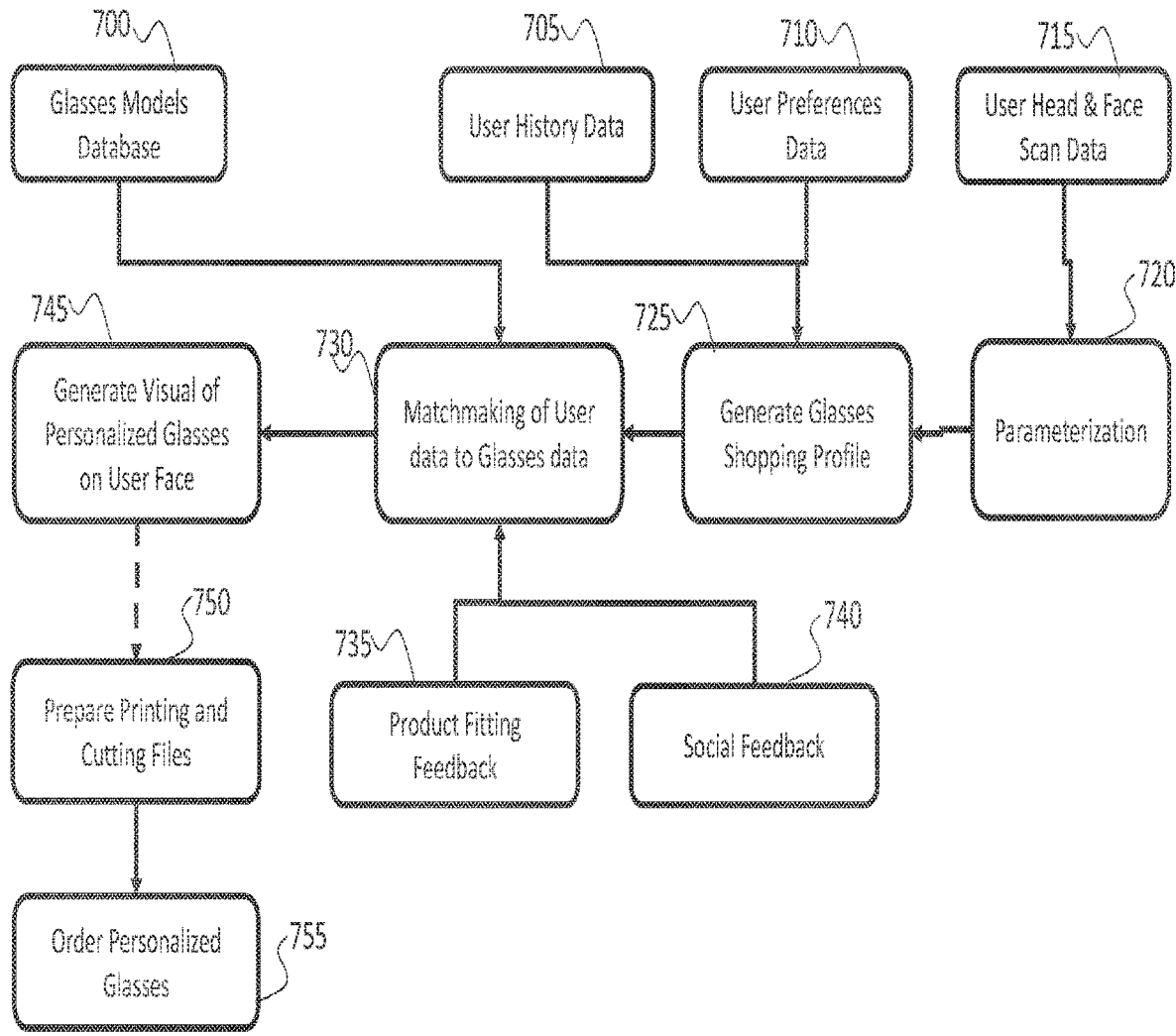
FIG. 7 is a flow diagram indicating an example of personalized eyewear shopping and manufacturing, online or offline, according to some embodiments.

Reference is now made to FIG. 7, which is a flow diagram indicating an example of personalized eyewear shopping and manufacturing, online or offline, according to some embodiments. This embodiment refers to both sunglasses and any type of optical glasses. As can be seen in the figure, glasses models information from glasses product database may be acquired at 700 from a glasses models or products database of various file types or data structures. According to some embodiments, glasses frame acquisition may be allowed by preparing parametric models, for example, by generating model parameters for multiple to input types, handling resolution adjustment, allowing automatic rigging and/or skinning, integrating range of motion animation and corrective shape-keys, etc.

At step 705 history data for a user, for example including facial anatomical landmarks and measured distances such as inter popular distance, location of each eye, cheek, temple, and various points on the ear and the nose etc., may be used. The general parameters of each face are also loaded, optionally including the volume, proportions and standard shape, may be retrieved, for example, based upon previous user examinations and/or purchases in a store or chain of stores, whether from online and/or in store experiences. At step 710 user preference data may be acquired, such as size, color, material, type preferences, usage needs etc. This data may be acquired directly or indirectly, for example, using purchase information, questionnaires, forms, and/or any other data acquisition method.

At step 715, scanned or graphic data may be acquired for a user, for example, from standard photographs, 2D and/or 3D image scanning, or from capture and processing using an automated shopping assistant. This includes, for example, any type of 3D scanning technology, as described herein or alternative 2D method using or not using reference objects for sizing. Typically, user head and face scan data may be acquired at this stage. In some embodiments, head and face model preparation and analysis may include model preparation such as smoothing and cleaning, rebuilding of the mesh with enhanced topology and/or optimized detail/weight ratio compression for optimal display in real-time, and/or orientation and alignment. Further, facial feature recognition may be used, for example, to generate a facial model rendered from multiple angles (e.g. 3 to 15 angles, to help determine normal, depth, color, or other parameters). Moreover, computer vision and/or machine learning algorithms may be applied, for example, to identify the eyes, nose, nose bridge, temples, ears, etc. The processing of the scanned data may further include projection of 2D landmarks to the 3D model, and validation of anatomical landmarks. In the case of absent landmarks, an assessment based on statistic or empiric results may apply for replacement of these landmarks.

At step 720 the processed user scanned data may be parameterized, for example, to extract the precise face length, width, height, proportions, nose width and volume, ear size, ear height, ear position, skin color, and/or other relevant facial characteristics and dimensions etc. This data may be processed by the personalized shopping system at 725, together with the user history data from 705 and user preferences data at 715, to generate a user glasses shopping profile based on the user's face profile and other physical properties, as well as user behavior and user preference data. In some embodiments the user glasses shopping profile includes both eyes of the user, which are typically different, thereby benefitting from individual profiles for left and right eyes. In some embodiments, the optical prescription will be collected using a picture, an e-form, or an embedded testing method inside the application or, in some cases, from external prescription files. According to some embodiments, the system may recommend specific models based on the face shape, previous purchases and history, and optionally based on a comparison (optionally anonymous) to similar avatars, At step 730, a matchmaking of the user glasses shopping profile to the glasses products being researched or required is executed. At this step, the product data from product database 700 is matched to products being researched by a user, in accordance to the specific user shopping profile, thereby allowing advanced filtering out of non-appropriate products for the specific user, and the advanced matching up of appropriate products, in accordance with the specific user's personal shopping profile and preferences.

At step 745, each frame is adjusted to fit on a user's face using frame Customization, that may include, for example: Taking key measurements on a subject or user's face; applying iterative comparison algorithms to adjust the frame to the face; digitally positioning the frame on the subject's face, orienting the frame appropriately to the face, scaling nose bridge size, width and position, adjusting arm folding, arm length, and pantoscopic tilt or angle, in accordance with the subject's face, as per the prepared user glasses shopping profile or avatar, etc.

At step 735 product fitting data from feedback of physically present personnel or remote people may be used to help modify the matchmaking of user data to product data, for example, the feedback from a salesperson or optometrist in a store may be used to update the user profile, or the feedback from remote people connected via a smart phone or computer for example. In some cases, for example, salesperson or friend feedback, such as which colors look good on a person or which size, style, models, type looks best etc., may be used by the user to update their shopping profile.

In some embodiments, at step 745, advanced graphic processing may be used for the user to virtually try on the product being researched, such that the user may see themselves dressed in the glasses in accordance with a digital simulation that places the glasses onto the user shopping avatar's face. The virtual try-on may, in some embodiments, include features such as physical simulation that positions the glasses at the correct or optimal position and can slide these along the nose. In addition, the try-on may include an overlay of a picture or 3D model on top of the face model and/or a series of pictures or any combination of the above. Animated effects may be included to emphasize the different attributes of the glasses including customization animation in the case of custom frames, or other animation such as fly in/fly out animation for switching between pairs. As described herein, the user may use the shopping avatar to provider further feedback to modify the user's shopping profile. In some embodiments, the user may view the customized frame on a digital version of his/her face, to provide profound visual feedback. For example, the user's face may be shown in a 3D viewer and the appearance may be enhanced, so as to provide one or more of 3D view manipulation (e.g. zoom, rotation), and animated effects to compliment user experience, such as a breathing face, smile, blinking or other animated or static visual effects. Further, the user may thus be provided with customization options including choosing any frame from the collection, customizing the frame and lens colors, customizing an automatic recommended fit, personalization of a file (e.g. text, prescription etc.), and allowing side-by-side comparison between different frames. In a variety of embodiments, a model is dynamically generated based on the product fitting data and/or user profile and augmented by modifying the generated model to incorporate the model of the product being tried on. This model can then be displayed using any of a variety of devices described herein, thereby allowing the customer to preview the products. At step 740, feedback may be acquired from social networks or to which a user is connected, to help modify the user shopping profile Of course, other steps of combinations of steps may be used to process the input data.

Step 750 refers to an embodiment in which the system allows production of custom eyewear based on automated or semi-automated parametric design of the frame to fit the user. At step 750 relevant glasses production printing and cutting files may be prepared by the system, if necessary. In some embodiments, 3D printing files of standard forms for examples STL or OBJ and 2D lens cutting files such as DXF etc. may be prepared. In some embodiments, the system creates two or more pairs of models for each of the frame designs. This allows, for example, for a lightweight model to be used for visualization purposes on the frontend of the application while maintaining a high-resolution model for the printing file preparation that may include, for example, high-resolution features and details, such as hinges, grooves, angles, earpieces etc. The eyewear customization of print models described herein may be automatic and/or manual. Further, the file preparation for 3D printing may include automatically fixing of printability issues, generation of normal, duplicates, holes and non-manifold geometry etc. In some embodiments, the system may create custom tags on the glasses or eyewear, for example, including text, QR code, and/or barcode that would allow traceability throughout the production and distribution process.

At step 755, a personalized pair of glasses may be ordered by a user, whether inside a physical store or an online store. Further, a personalized product may be requested from the store, or ordered from a manufacturer who may produce a product based upon the user's request such that the product is a once-off customized product for a user.

According to certain embodiments, a system and process are described for automated personalized product ordering using a digital mirror or personalized viewing protocol. This embodiment may integrate virtual reality and/or augmented reality to manipulate, view and/or try on designated equipment such as existing or designed glasses, on a screen, table, smartphone, communications device etc., to allow visual representation of the custom or non-custom frames on the face of the client.

According to certain embodiments, a file format adapted to allow personalized product ordering is provided. This file format incorporates all of the relevant information, including physical properties and personal preference, to represent a user and help the user perform personalized custom or non-custom shopping for clothing, eyewear, footwear, or other body related products. This avatar standard format may be used to plugin into substantially any shopping platform, online or physical, to allow customization of the store to fit the physical and aesthetics needs and preferences of a customer.

Reference is now made to FIGS. 8A-8G, showing different views of a POS apparatus, launchpad, or kiosk, according to some embodiments, in some embodiments, the shopping assistant apparatus generates a user avatar based on one or more of 3D scanning, image acquisition using one or more cameras, measuring a user profile with pressure plates, etc. In some embodiments, a standing pad may be used to function as a positioning pad or reference for a user to stand on to perform a body scan. In some cases, the standing platform may include lighting at the bottom of the standing pad, to support acquisition accurate measurement of any colors from cameras or scanners on the apparatus, by minimizing or marginalizing shadows, and causing a black/white perimeter effect. In some embodiments, there may be a proximity sensor for each foot to measure if the feet are in place or close, and tell the user to move if necessary. Further, the apparatus may include a distance or proximity sensor/robot that recognizes approaching user to attract the user to the apparatus, in which case the apparatus may be automatically started when a user enters a selected geographical zone. In further embodiments, a sensor may be used for measurement of the height of a user's instep—to establish instep volume, for example. In still further embodiments, specialist sensors may be used, for example, sensors to measure diabetes sores etc. Such sensors, such as cameras, 3D sensors, all around cameras, and or multiple cameras may be used.

Figure 8A:
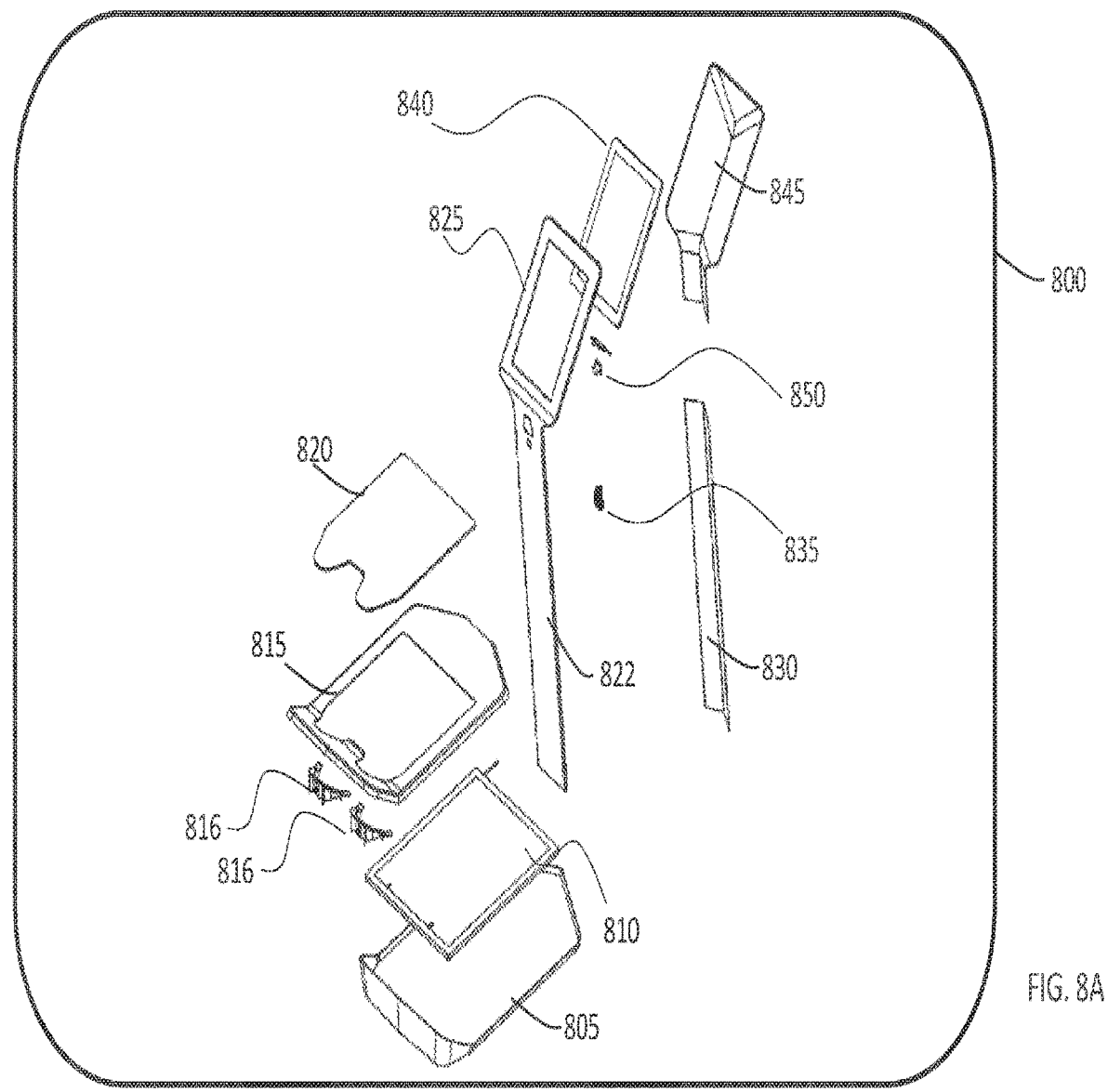
FIG. 8A shows an exploded view of an example of a shopping assistant apparatus, according to some embodiments.

FIG. 8A is an exploded view of an example of the components of the POS apparatus or kiosk device in accordance with an embodiment of the invention. As can be seen, the kiosk device 800 may include a standing base 805, a light source for optionally lighting the standing base, proximity sensor(s) 816, for identifying the positioning of feet to be scanned by kiosk device 800, a standing pad 815, with space for standing on with both feet, and a pad layer 820, on which the feet are mounted on. In some embodiments pad layer 820 may be integrate a pressure sensing mechanism, such as flatbed scanner; plate of pins; pressure plate; touch screen type surface with a capacitor and/or pressure sensor element etc., to determine foot arch dimensions. In some embodiments, arch dimension measurement element(s) may be used to determine a need for and/or dimensions of an inner sole(s) for a user.

In some embodiments, arch dimension measurement element(s) may be used to determine a need for and/or dimensions of a user's instep profile.

In some embodiments, arch dimension measurement element(s) may be used to determine a need for and/or dimensions of a user's ball (of the foot) profile.

In other embodiments one or more lasers or other lighting mechanisms may be used to determine foot arch, ball, or instep dimensions. In one example, a laser from above and/or below the foot may be used to show the height or arch and/or size of a bridge of the foot, for example, by identifying the size of the "hidden" area not seen by laser, and using the "hidden" space to determine parameters such as height, at different points on the foot. In a further example, diffraction grating, prism, or other filters can use multiple lines to be able to identify high points and/or contours of the foot.

In still further embodiments, one or more lights, optionally of different colors, separately and/or in combination, may be used, together with image processing to neutralize a color of a sock and/or foot, and help identify non-foot space. In other embodiments, one or more may be identified with the arch of a foot, for example, using a background elimination technique.

Further, kiosk device 800 may include a main body 822, including a computer holding stand 825, and a camera holding element 826, for holding one or more camera elements 835, a panel element 830, a further panel or cover element 845, a computing screen, preferably a touch screen PC or tablet 840, and optionally having a place for setting up a proximity sensor 850, for example, for identifying a user proximity to the computing device.

Figures 8B, 8C:
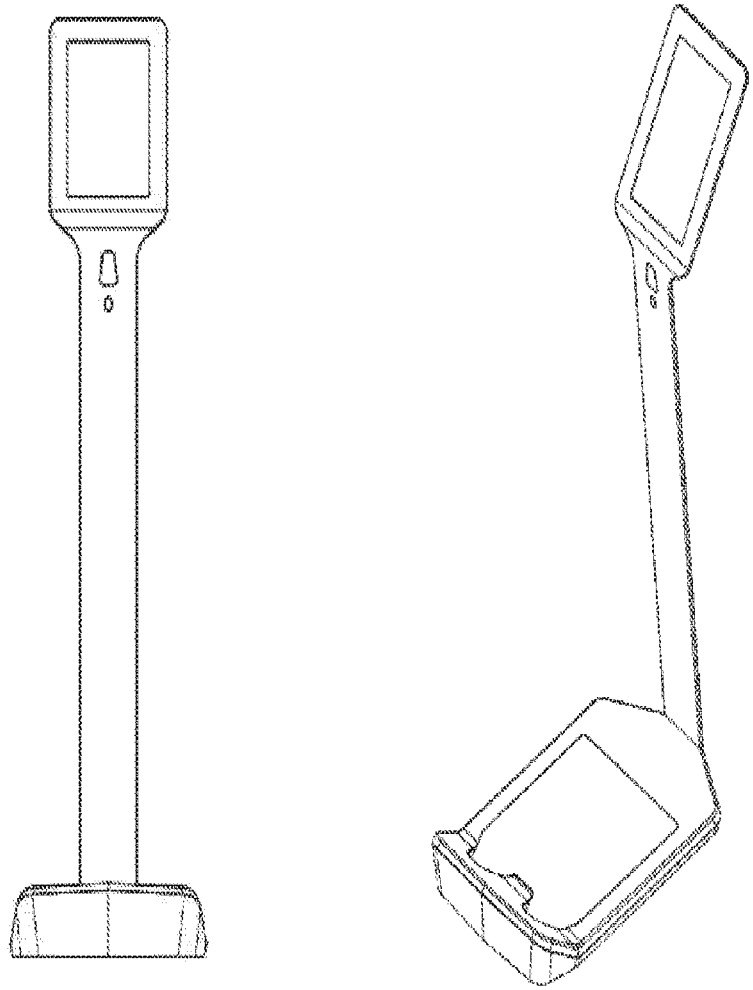
Figure 8D:
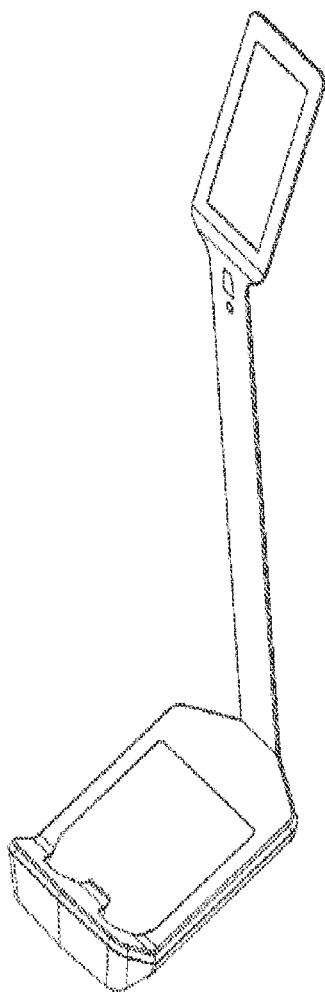
Figure 8E:
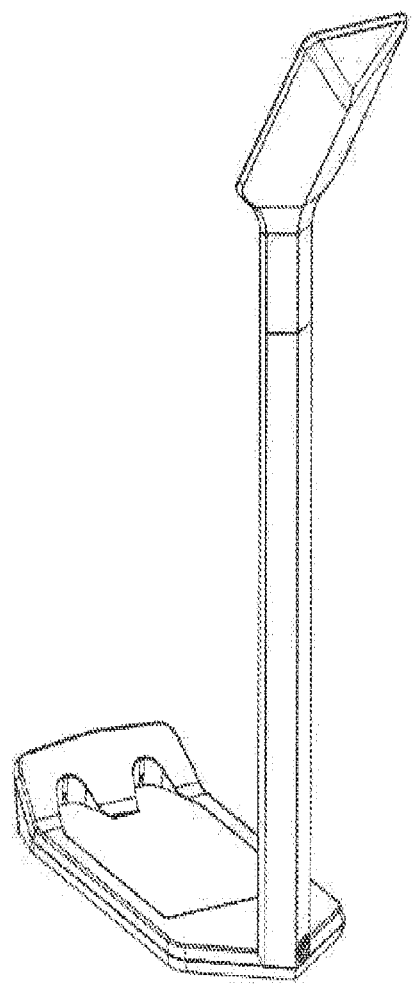
Figure 8H:
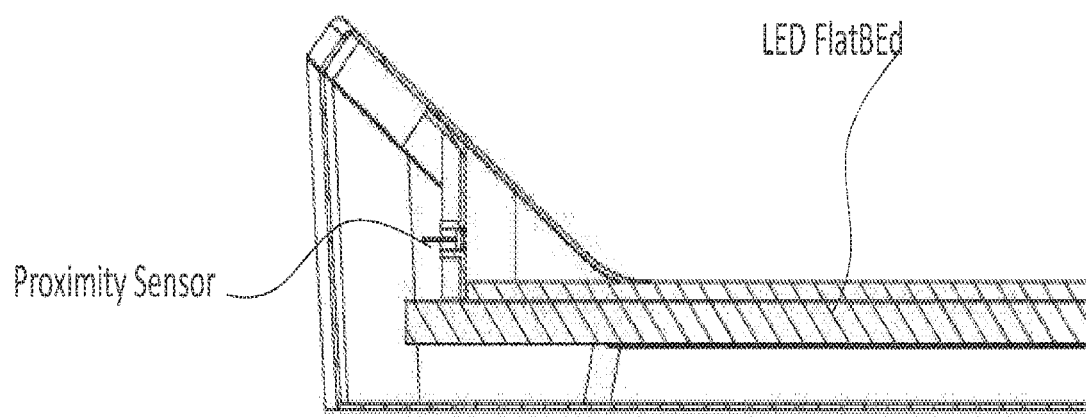

FIG. 8B is a front view of an example of the POS apparatus or kiosk device. FIG. 8C is an isometric view of an example of the POS apparatus or kiosk device. FIG. 8D is an isometric front view of an example of the POS apparatus or kiosk device. FIG. 8E is an isometric back view of an example of the POS apparatus or kiosk device. FIG. 8F is a side view of an example of the POS apparatus or kiosk device. FIG. 8G is a top view of an example of the POS apparatus or kiosk device. FIG. 8H is a view of an example of one or more sensors in POS apparatus or kiosk device. As can be seen, the kiosk device, multiple sensors may be configured, for example, one or more proximity sensors, a LED flatbed may be configured for providing a light source from under the standing area.

Figure 9:
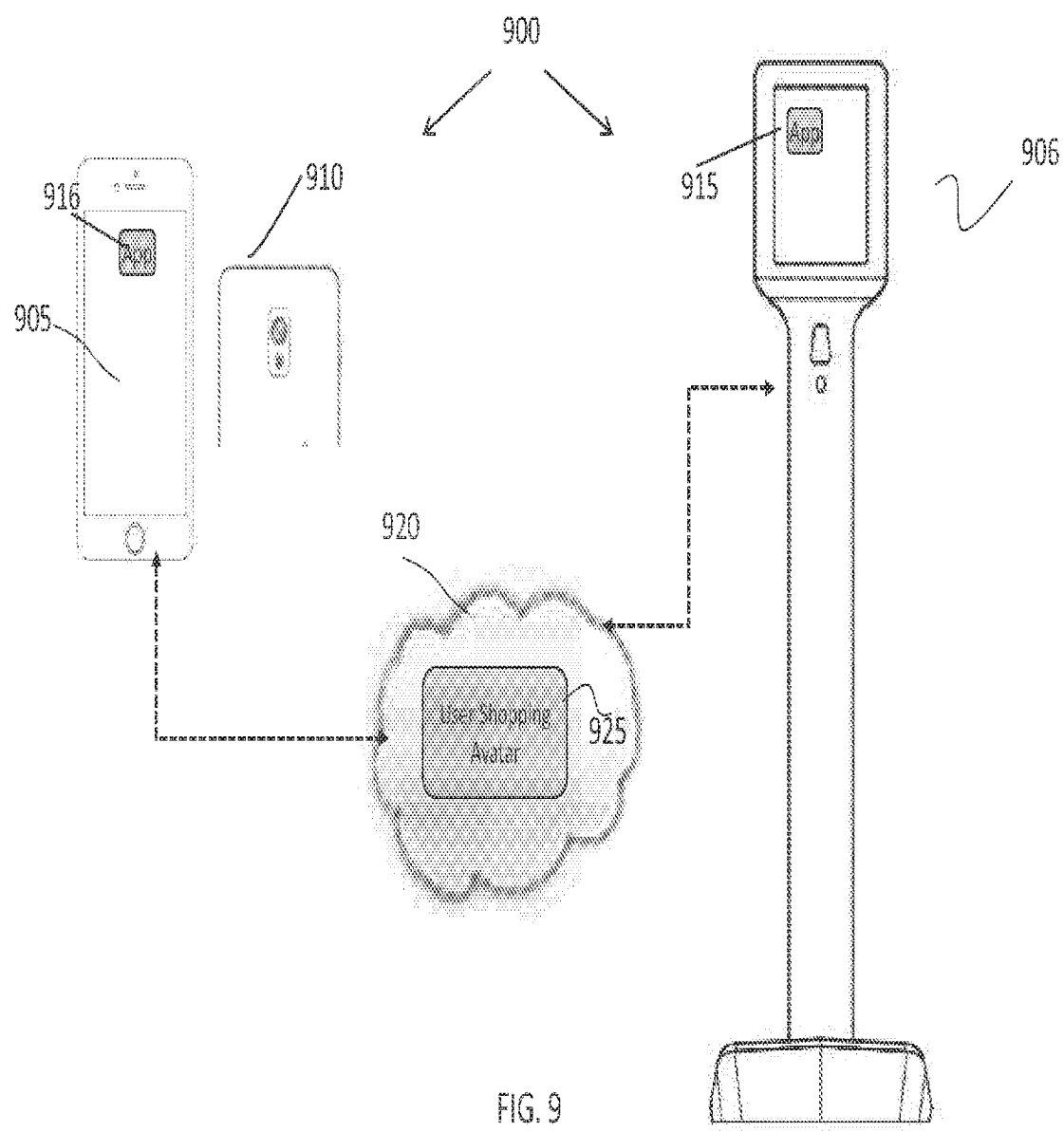
FIG. 9 shows a shopping assistant system, according to some embodiments.

Reference is now made to FIG. 9, which shows a schematic view of the shopping assistant system 900, including automated shopping assistant apparatus 906, which integrates a computing component adapted to run a shopping assistant application or software program 915. Automated shopping assistant apparatus 906 is adapted to connect to a communications network, such as communications cloud 920, to access the user shopping profile 925, if on the cloud, and/or transmitting the user shopping profile to the cloud. Further, a remote user mobile device, such as a smart phone, tablet or other camera supporting mobile communications device 905, 910, according to some embodiments, which are adapted to run a shopping assistant application or software program 916. Devices 905 and 910 typically include one or more cameras 910, for example to allow capturing information about a person's foot or both feet optionally simultaneously using a standard picture/scan, video, series of pictures or advanced sensing components such as structured light, time-of-flight or others in IR/near-IR or visual light conditions. Devices 905/910 typically include a gyroscope and/or accelerometer to provide camera orientation data to the device camera, for example, to only allow a picture to be taken when the camera is substantially flat. In some embodiments, internal sensing components and/or additional sensors may be attached to the communications devices 905, 910 to supply supplementary data to the system. For example, such sensors may assist in improving accuracy of measurements, assisting the user during the capturing of the data with real-time feedback, and/or providing input to the calculation engine. Remote devices 905 and 910 may communicate with communications cloud 920, and in particular, may be connected to the device user's digital shopping avatar or profile 925. In some embodiments, a user may generate the shopping profile using the mobile device 905, 910, for one or more users, in addition to or in place of the automated shopping assistant apparatus 906. In a variety of embodiments, the shopping assistant application or software program 916 includes an application programming interface (API) and/or a software development kit (SDK) that can be utilized by a third-party software application (executing on the mobile communications device and/or a remote system) to incorporate some or all of the features described herein.

Figure 10:
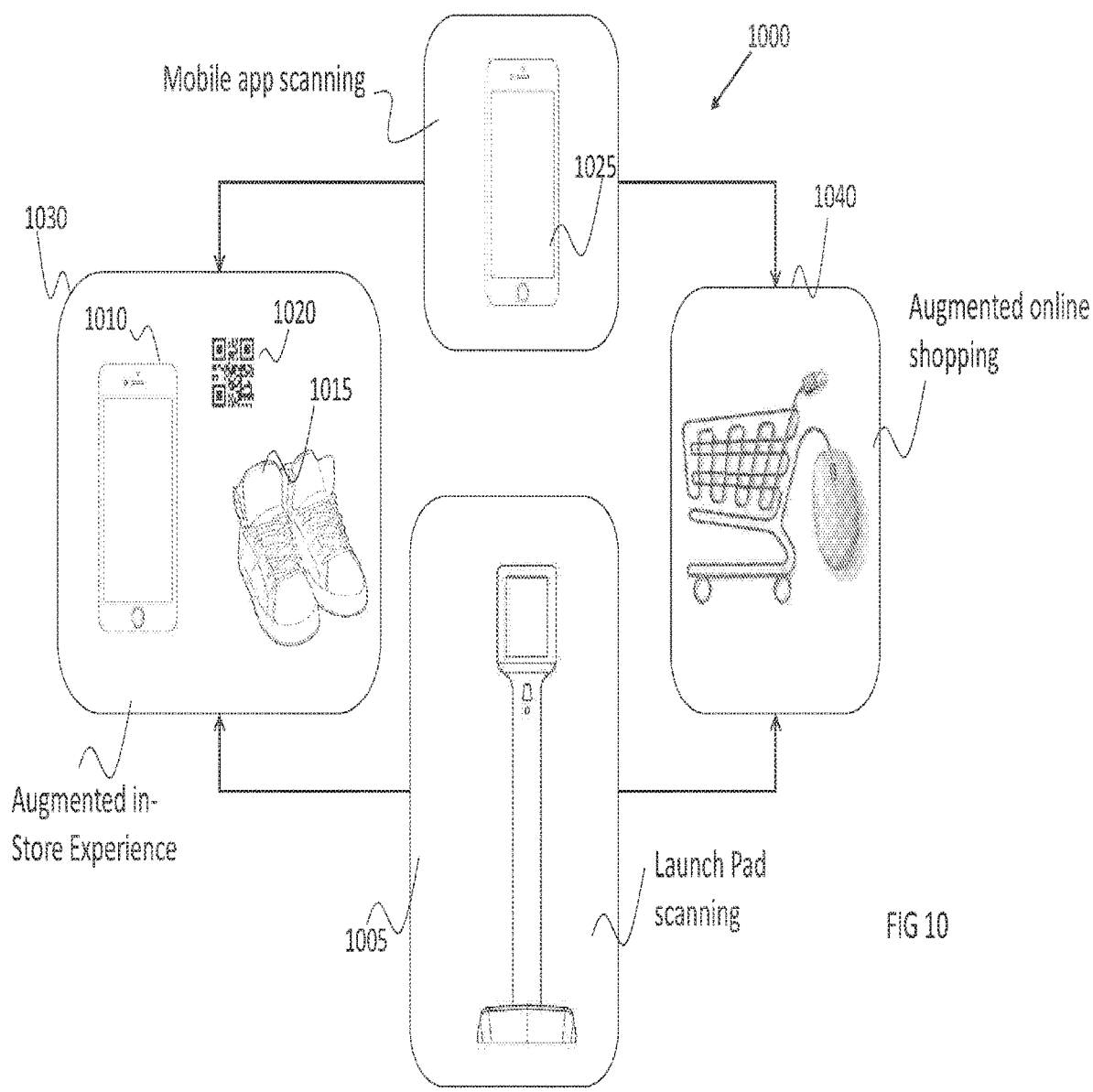
FIG. 10 is a flow diagram indicating an example of integrated usage of a shopping assistant in store apparatus, and a remote user communications device with a personalized shopping support application, according to some embodiments.

Reference is now made to FIG. 10, which shows a schematic view of the shopping assistant system 1000, and the workflow between the components. As can be seen, the launch pad or shopping assistant apparatus 1005 can scan a user, for generation of a shopping profile for the user. The generated profile is sent to the user's mobile device 1010, and can subsequently be used for scanning products, such as shoes 1015, optionally via a product tag, such as QR code 1020, representing the selected product. Further, in some embodiments, the user may build a shopping profile using a mobile Application 1025. In some embodiments, the user shopping profile can be used to augment in store shopping, at 1030. In some embodiments, the user shopping profile can be used to augment online shopping, at 1040.

Figure 11A:
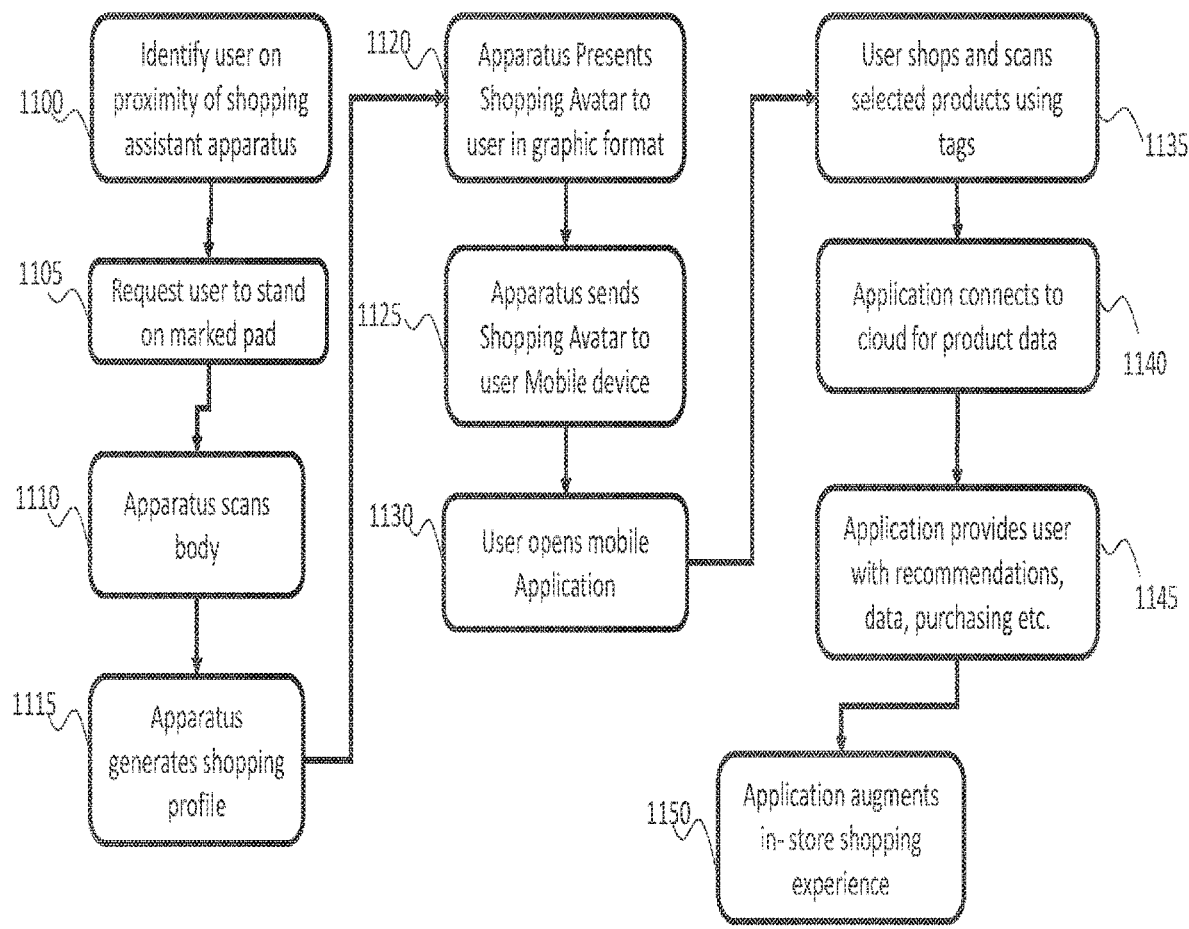
FIGS. 11A and 11B describe examples of a process of shopping assistant usage, according to some embodiments.

Reference is now made to FIG. 11A, which is a flow diagram indicating an example of personalized footwear shopping in a shopping store using an in store or POS automated shopping assistant apparatus, in combination with a mobile computing device application. As can be seen, at step 1100, a user may be identified via a proximity sensor of a shopping assistant apparatus. At step 1105, the user may be requested to stand on the marked pad, and optionally provides interactive guidance to make sure the user stands in the correct position to allow accurate scanning. At step 1110, the apparatus scans the body or body parts/elements, and at step 1115, generates a shopping profile based on the scan. At step 1120, the apparatus may present the shopping avatar to the user in a graphic format. At step 1125, the apparatus may send the shopping avatar to the user's mobile device. At step 1130, the user may open a shopping application that may use the application to assist with shopping and/or research. At step 1135, the user may use the avatar on their mobile device to shop or do research, for example, by scanning selected products using coded tags, for example, QR codes or barcodes. In general, the scanned products may be processed in a way that relates to the user avatar, for example, to determine if the product will fit the avatar, suits the user's profile or preferences etc. In some cases, the application may provide a graphic simulation of the selected product on the avatar. At step 1140, the application may connect to a communications cloud or other database, to match the selected product(s) with product data, for example, to help determine purchasing options, inventory status, product qualities, product features, reviews, sizes etc. In some cases, at step 1145, the application may present the user with recommendations, purchase data etc. In still further steps, the application may augment the in-store shopping experience, for example, by providing shopping advice, options, shortcuts, access to additional databases etc.

Figure 11B:
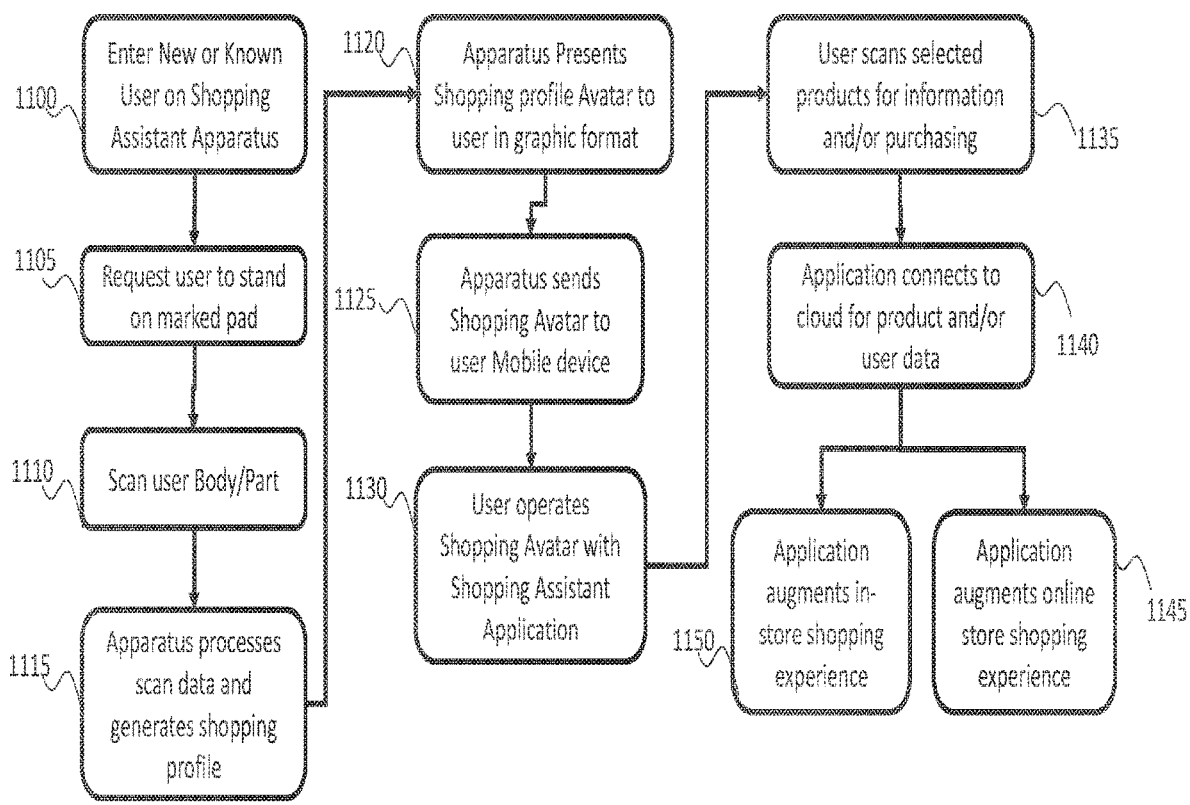

Reference is now made to FIG. 11B, which is a flow diagram indicating an example of personalized footwear shopping in a shopping store using an in store or POS automated shopping assistant apparatus, in combination with a mobile computing device application. As can be seen, at step 1100, a new or known user can be entered on the shopping assistant apparatus—for example, via a biometric identifier, entry screen etc. At step 1105, the user may be requested to stand on the marked pad, and optionally provides interactive guidance to make sure the user stands in the correct position to allow accurate scanning. At step 1110, the apparatus scans the body or body parts/elements, and at step 1115, processes the scan data and generates a shopping profile based on the scan. At step 1120, the apparatus may present the shopping profile as a simulation, shopping avatar or other virtual assistant, to the user in a graphic or other format. At step 1125, the apparatus may send the shopping avatar to the user's mobile device, in a format or configuration usable by the device's software, code, or application(s). At step 1130, the user may open a shopping application or other program that may operate the shopping avatar with a shopping assistant application. At step 1135, the user may use the avatar on their mobile device to shop or do research, for example, by scanning selected products using coded tags, for example, QR codes or barcodes. In general, the scanned products may be processed in a way that factors in the generated shopping avatar, for example, to determine if the product will fit the avatar, suits the user's profile or preferences etc. In some cases, the application may provide a graphic simulation of the selected product on the avatar. At step 1140, the application may connect to a communications cloud or other database, to match the selected product(s) with advanced product data, for example, to help determine purchasing options, inventory status, product qualities, product features, reviews, sizes etc. In other cases, at step 1140, the application may connect to a communications cloud or other database, to match the selected product(s) with advanced user data, for example, to help determine user preferences, user history, and user profile updates etc. In some cases, at step 1145, the application may present the user with recommendations, purchase data, purchase choices, reviews, news etc., to help augment the online store shopping experience. In some cases, at step 1150, the application may present the user with recommendations, purchase data, purchase choices, reviews, news etc., to help augment the in-store shopping experience, for example, by providing shopping advice, options, shortcuts, access to additional databases etc.

In some embodiments, the user shopping experience may be executed for additional users connected with a user of the shopping assistant. In such cases, the user application may contain shopping profiles of multiple users, thereby allowing the user of the mobile device to execute shopping for multiple users in according to the users' shopping profiles.

In accordance with some embodiments, mobile and/or user avatars may be shared with other users. For example, a user may have access to or control multiple user profiles, with the users' authorization, for example, in a wallet or holder of avatars or profiles. In such a case, the controlling user may shop on behalf of other users. For example, a parent may keep the profiles of all their family members, allowing the parent to easily shop online and/or offline for all the associated family members.

In accordance with some embodiments, additional personalization can be provided for each user mobile shopping avatar or user shopping avatar, such as an icon or picture. Such personalization may be particularly useful for a controlling user to manage multiple user or mobile shopping avatars. This information associated with any identifier may be saved on the cloud avatar database and associated with a user in any platform that s/he uses. For example, in the case where a family member scans and saves one or more of his or her family members' profiles, these may be shared with another family member(s) who can now load them into an in-store system or an ecommerce website being used, and subsequently use this personalized information. In the case of a website, the output may be personalized in accordance to this personalized data and may even include the other user's picture or avatar or 3D model right next to the information provided, to reassure the user's confidence that the recommendations are personal and based on his or her profile, or other profiles being legitimately used by the user.

In accordance with some embodiments, an online store may include a user shopping virtual assistant, using a profile plug in or other digital object, that may appear on substantially any webpage (whether optimized for mobile phone, desktop, notebook, tablet, wearable etc.), when relevant, to offer recommendations, guidelines or other assistance to the user. For example, the virtual shopping assistant may show information about different fits for the user profile being used, or otherwise assist the user. For example, a user with a foot size of 41 European, while shopping or browsing in the Nike online store, may be informed that the equivalent size for their feet profile in Nike shoes is 42 European or US size 10.5. Additionally, if the user profile includes preference data, such as preferred colors and fits etc. the shopping virtual assistant may also provide suggestions or guidelines based on the user preferences. For example, in the Nike shoes store, the shopping assistant may suggest to the user to look for options that are 10.5 American size, in athletics shoes, in either blue or green, etc.

In some embodiments, the virtual assistant may take the user directly to a page or pages that match the user shopping profile data and preferences. In one embodiment, the profile may direct the website into the sections that are interesting or relevant to a specific user while avoiding irrelevant pages. In a variety of embodiments, the system may use the personalized information, alone or in aggregate with additional users, to rearrange the website and create a personalized version of the website that may represent what s/he may be most interested in and what would best fit for him or her.

In accordance with some embodiments, the virtual shopping assistant may allow rendering of 3D views of a product being viewed, and optionally of a personalized product. For example, a custom shoe being viewed in accordance with a user's shopping profile may be rendered in 3D from all sides and/or angles to assist the user is viewing the product from multiple dimensions.

In accordance with some embodiments, a virtual fitting module may be provided, to allow dressing of the shopping avatar with the product(s) being viewed.

In accordance with some embodiments, a user shopping avatar may be a once off avatar for a store. In other embodiments, the user shopping avatar may be applicable to a chain of stores. In other embodiments the user shopping avatar may be applicable to a variety of brands or stores, for example, all owned by a parent entity. In other embodiments, the user shopping avatar may be applicable to any or all stores, via connecting to the universal user profile in the cloud.

Figure 12A:
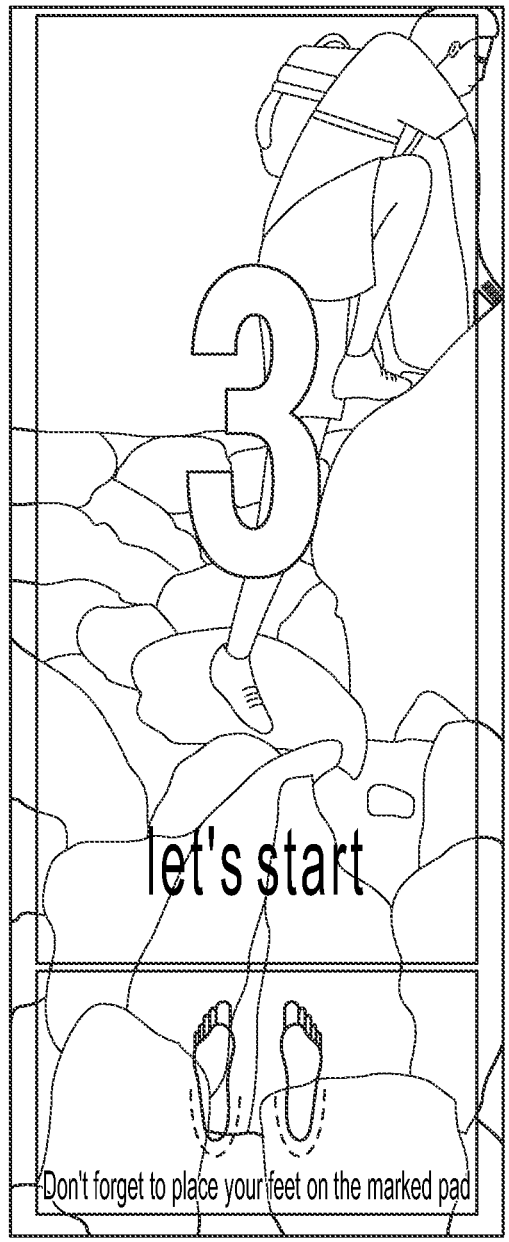
FIGS. 12A-12B are examples of screenshots showing interactive screens on the shopping assistant screen, for guiding a user to place their feet on the marked pad, according to some embodiments.
Figure 12B:
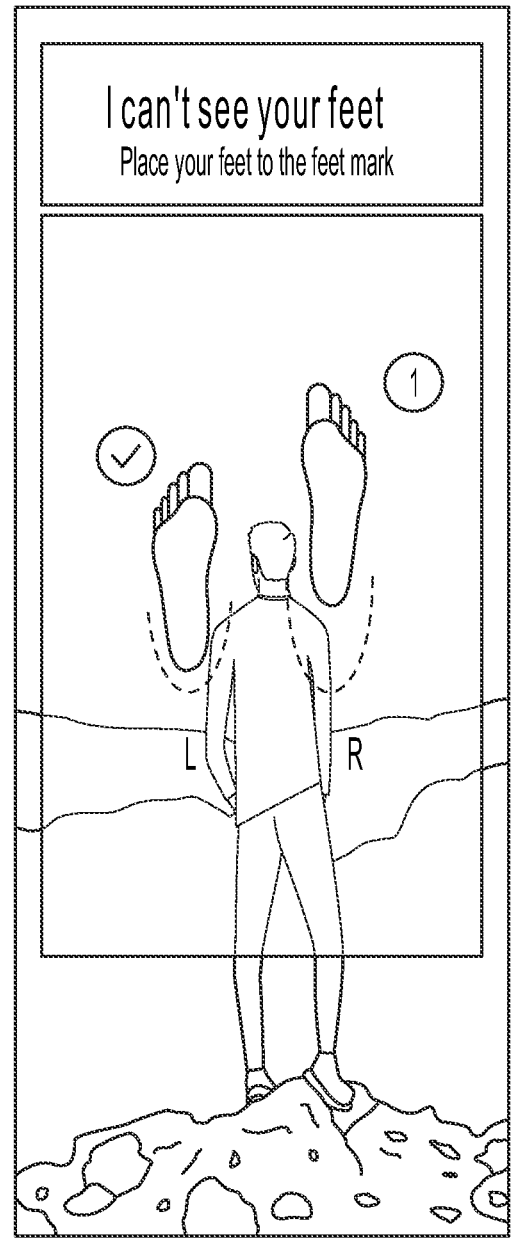
Figure 14A:
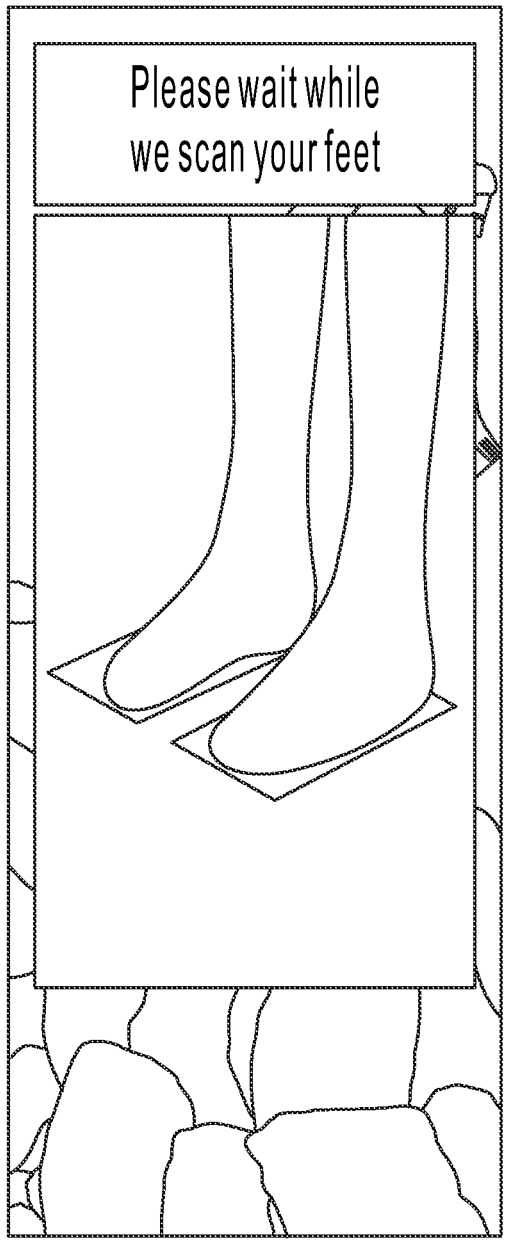
FIGS. 14A-14B are examples of screenshots on the shopping assistant screen or mobile screen, for showing a simulated rendition of a pair of scanned feet and lower legs, according to some embodiments.
Figure 14B:
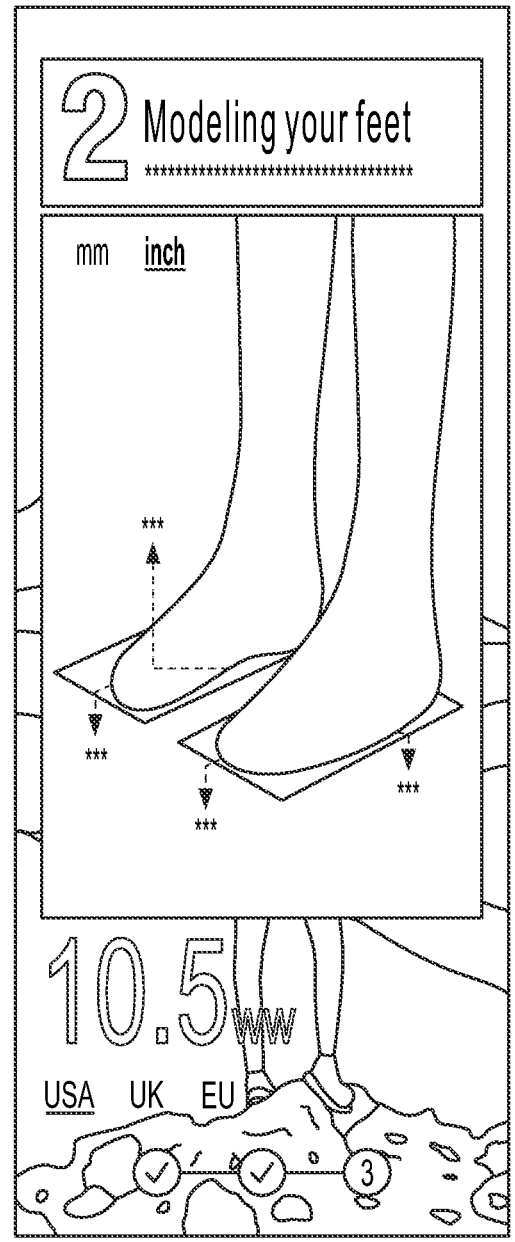
Figures 15A, 15B:
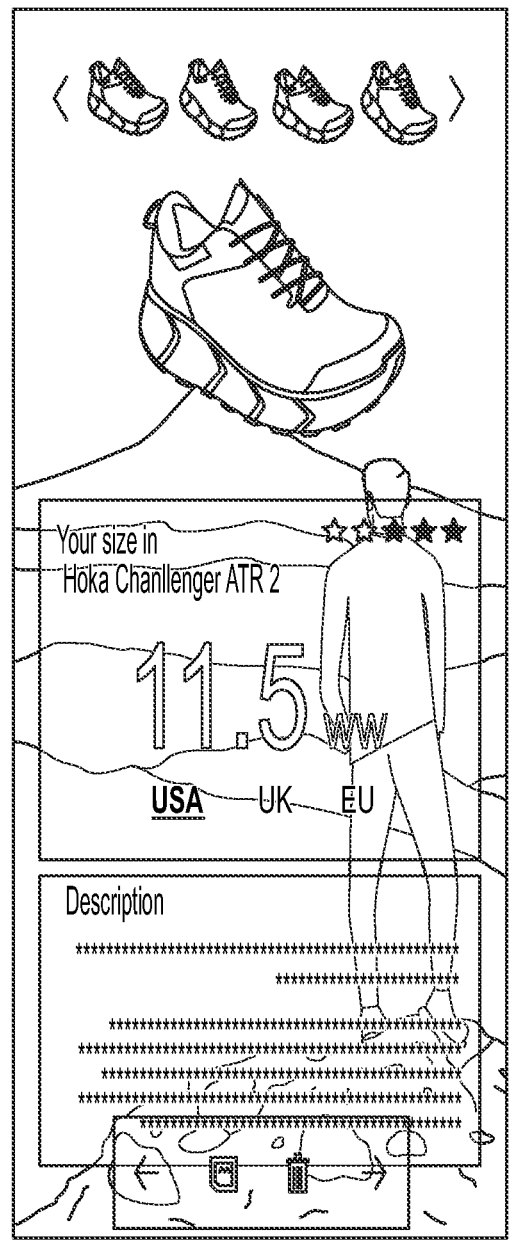
FIGS. 15A-15B are examples of screenshots on the shopping assistant screen or mobile screen, for assisting a user in entering behavior related information, that may be used to provide better user related output.

Reference is now made to FIGS. 12A-12B, which are examples of screenshots showing interactive screens of the shopping assistant screen, for guiding a user to place their feet on the marked pad, according to some embodiments;

Reference is now made to FIGS. 13A-13B, which are examples of screenshots showing an interactive guide of the shopping assistant screen or mobile screen, for helping the user to define their profile, and their contact information, according to some embodiments;

Reference is now made to FIGS. 14A-14B, which are examples of screenshots of the shopping assistant screen or mobile screen, showing a simulated rendition of a pair of scanned feet and lower legs, according to some embodiments;

Reference is now made to FIGS. 15A-15B, which are examples of screenshots of the shopping assistant screen or mobile screen, for assisting a user in entering behavior related information that may be used to provide better user related output.

Reference is now made to FIGS. 16A-16D, which show a set of perspective views of an example of a shopping assistant standing surface, according to some embodiments. As can be seen in the figures, standing surface 1600 is generally a flexible surface, such as a mat or carpet, optionally constructed from PVC, rubber, polyurethane, paper, cardboard, or any other suitable material. Standing surface 1600 typically includes a 3D part or element 1605 that replaces a wall, and allows correct positioning of feet for scanning. This 3D element functions as a foot barrier against which the back of the foot is placed. Standing surface 1600 typically includes markings 1610, dots or indicating graphics, to enhance accuracy of scanned images. In some embodiments, markings 1610 may function as markers that may have differing sizes, dimensions, functions etc. The markers can be all the same or some may be different from others.

Figure 17:
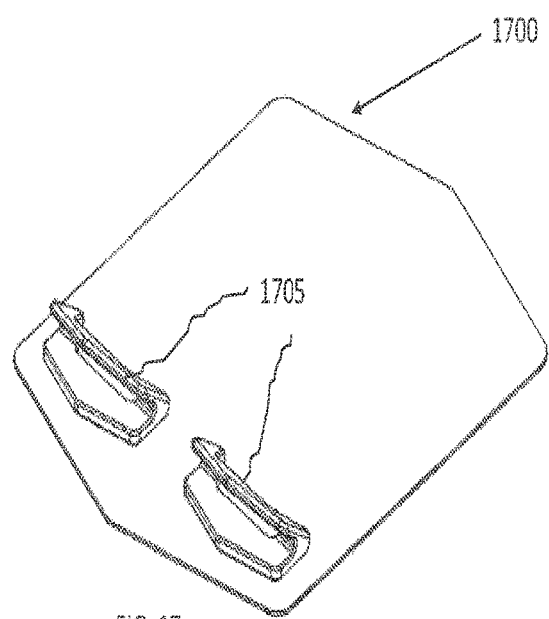
FIG. 17 shows an additional version of a shopping assistant standing surface, according to some embodiments.

FIG. 17 shows an additional version of a shopping assistant standing surface, according to some embodiments. As can be seen, there is a 3D foot placement element 1705 for each foot.

Figure 18:
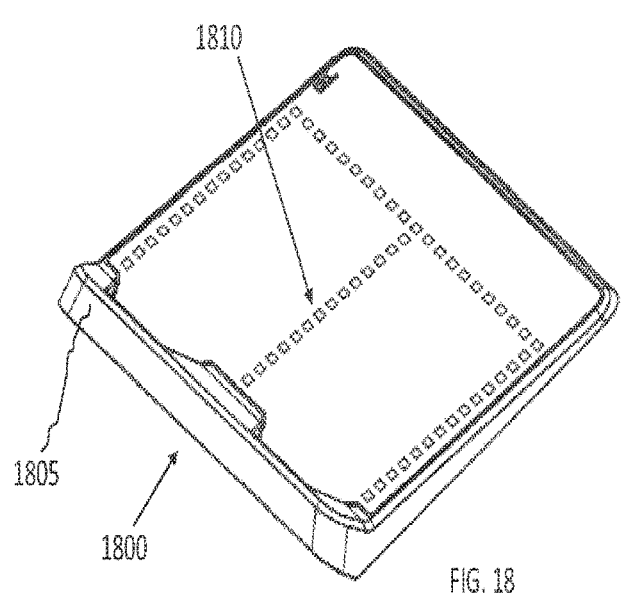
FIG. 18 shows a further version of a shopping assistant standing surface, according to some embodiments.

FIG. 18 shows a further version of a shopping assistant standing surface, according to some embodiments. As can be seen, there is a differently shaped 3D foot placement element 1805.

Figure 19:
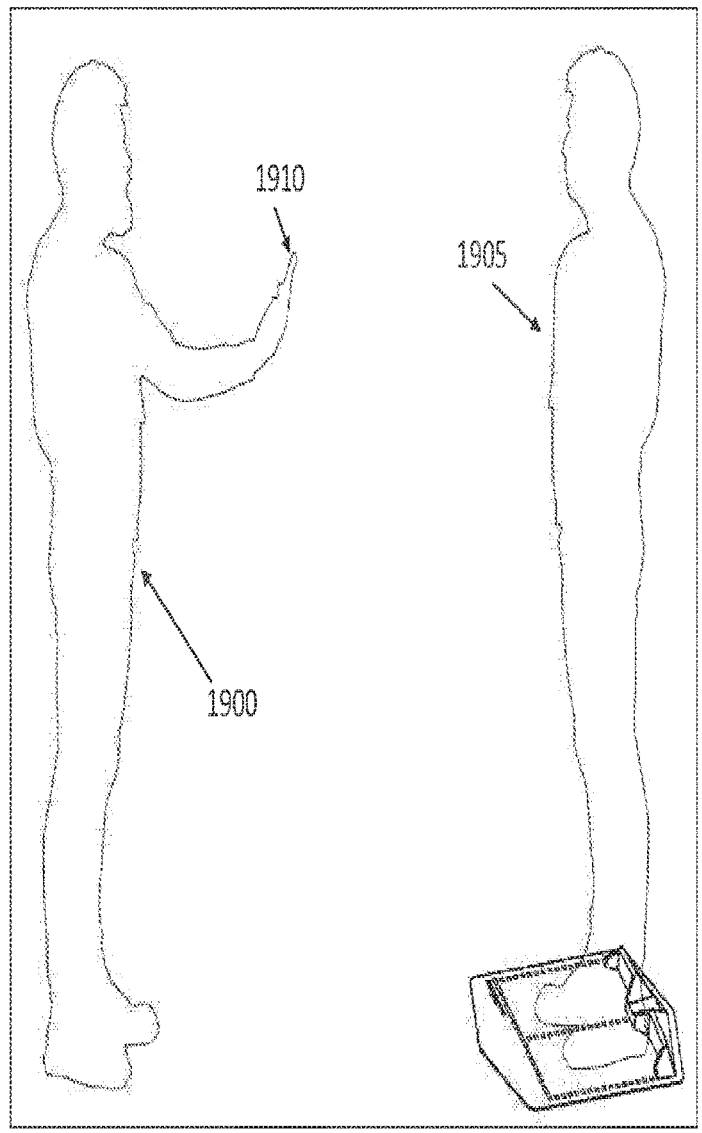
FIG. 19 shows a first user case in which a virtual graphic example is provided showing usage of the shopping assistant apparatus, according to some embodiments.

FIG. 19 shows a first user case in which a virtual graphic example is provided showing usage of the shopping assistant apparatus, according to some embodiments. As can be seen, the assistant 1900 may photograph or scan system user 1905, using a standard camera 1910 (e.g., phone or tablet) and/or a depth camera.

Figure 20:
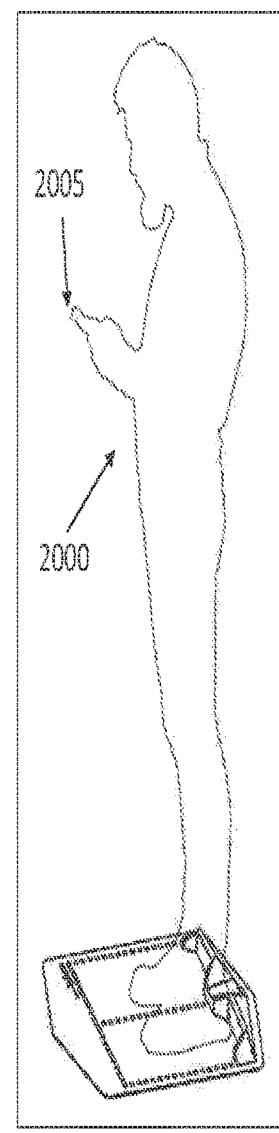
FIG. 20 shows a second user case in which a virtual graphic example is provided showing usage of the shopping assistant apparatus, according to some embodiments.

FIG. 20 shows a second user case in which a virtual graphic example is provided showing usage of the shopping assistant standing surface, according to some embodiments. As can be seen, the system user 2000 map perform a self-picture or scan, using a standard camera 2005 (e.g., phone or tablet) and/or a depth camera.

Figure 21:
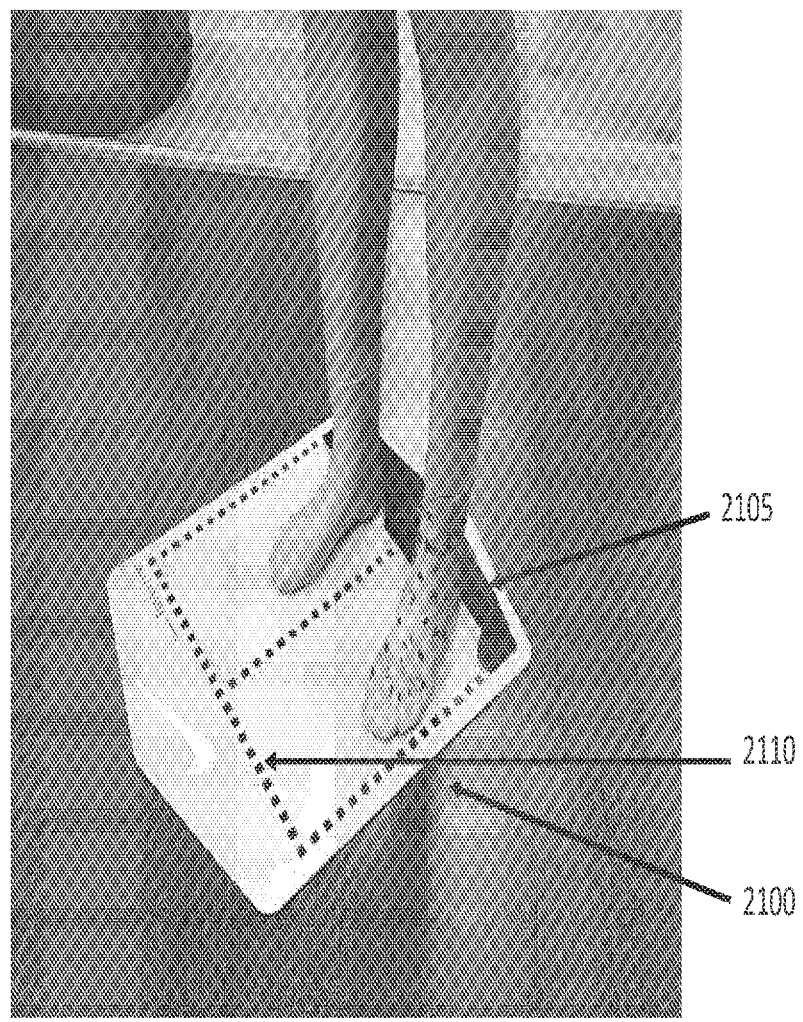
FIG. 21 is a picture showing an example of a user positioned on a shopping assistant apparatus, according to some embodiments.

FIG. 21 is a picture showing an example of a user positioned on a shopping assistant standing surface, according to some embodiments. As can be seen in the picture, standing surface 2100 typically includes a 3D part or element 2105 that replaces a wall, and allows correct positioning of feet for scanning. This 3D element functions as a foot barrier against which the back of the foot is placed. Standing surface 2100 typically includes markings or indicating graphics 1610.

In some embodiments, the shopping assistant standing surface may include active components such as light, detector, sound etc. In such cases, the shopping assistant standing surface may include a power source, optionally battery powered, and one or more suitable sensors.

In some embodiments, the shopping assistant standing surface may include a pressure plate (optionally having Bluetooth or other wireless communication capabilities) to assist in receiving additional data on the shape of the user's arches.

In some embodiments, the shopping assistant standing surface may be foldable, for example for storage, transportation, or display reasons.

In a further configuration, the shopping assistant standing surface may be integrated onto a fitting chair as can be seen with reference to FIG. 22.

In some embodiments, the shopping assistant standing surface may include two standing sides with two different colors (e.g., for image recognition).

In some embodiments, the shopping assistant standing surface may be placed on, fitted onto, or integrated with a fitting chair or stool. In such cases, the standing surface may be placed to receive a user's feet when in sitting pose.

In some embodiments, the shopping assistant standing surface may include an augmented reality (AR) functionality, thereby allowing the user standing on the standing surface to browse through shoes on his or her feet and see them on the generated model. For example, this may allow the customer looks at his/her bare feet or feet with socks, and see through AR glasses or a phone/tablet different shoes that s/he can browse from in augmented reality tracking based on her/his feet.

In some embodiments, the shopping assistant apparatus may help a chain store generate loyalty online and/or offline, by allowing automated shopping assistance in multiple stores, proactive up sales and cross sales, etc.

In one embodiment of the present invention, the user shopping experience for footwear may be substantially enhanced, by applying the following steps: Measuring on apparatus 185 a user physical profile, and providing a user standard size as well as modifications for different shoes/brands; Getting an ID or shopping profile of the customer to the customer's mobile computing or communications device; and getting an ID or shopping profile of the customer from apparatus 185 to a communications cloud.

In a first user case of the present invention, where a user has no previous user profile, the shopping assistance process may be implemented as follows: The user generally removes shoes and stands on the Launch pad or shopping assistant apparatus at entrance to a store or shopping areas. In the current example, a footwear application is described. The apparatus subsequently measures/scans the user's body area, such as feet, and thereafter the apparatus, or cloud network, may process the user data and generate a user shopping avatar. Once generated the avatar is sent to the user's mobile device, running the shopping assistant Application, for example using mail, beacon, SMS, QR code, IR beam etc. The user may then scan wanted shoes, whereby the apparatus is configured to match and then try on shoes wanted to an avatar to provide best fit. The apparatus may also provide to the user related product information, such as availability, colors, sizes, related shoes, rankings etc.

In a second user case of the present invention, where a user has multiple devices, the shopping assistance process may be implemented as follows: The user generally removes shoes and stands on the Launch pad or shopping assistant apparatus at entrance to a store or shopping areas. In the current example, a footwear application is described. The apparatus subsequently measures/scans the user's body area, such as feet, and thereafter the apparatus, or cloud network, may process the user data and generate a user shopping avatar. Once generated the avatar is sent to the user's mobile device, running the shopping assistant application, for example using mail, beacon, SMS, QR code, IR beam etc. The user may then scan wanted shoes, whereby the apparatus is configured to match and then try on shoes wanted to an avatar to provide best fit. The apparatus, in the current embodiment, may provide to the user expert or consulting information, thereby functioning at least in part as a sales representative. The apparatus may also provide related product information, such as availability, colors, sizes, related shoes, and rankings, as well as an option to measure movement/style/weight etc.

In a third user case of the present invention, an augmented shopping experience may be delivered, whereby the automated shopping assistance process may incorporate a local shoe scan. In some cases, user data or avatar's may be used to filter in appropriate reviews/comments from online world+ social feedback+ rankings, sales information/history, recommendations, up sales, cross sales etc.

Although the present invention has been described in certain specific aspects, many additional modifications and variations would be apparent to those skilled in the art. In particular, any of the various processes described herein can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A shopping assistant system for shopping using a shopping profile, comprising:
a mobile device comprising a processor, a memory, and a camera, wherein the memory stores instructions that, when executed by the processor, cause the mobile device to:
display an image of a standing surface;
capture, using the camera, an image of at least a part of a body of a user when the body of the user is located within the standing surface; and
generate a 3D user shopping profile based on the image of at least the part of the body of the user and further including at least one: of user physical properties, user behavior data, or user preference data;
a mobile device application configured to apply the 3D user shopping profile in a store;
a shopping assistant server connected to a shopping assistant database, based in a communications cloud, wherein the shopping assistant server is configured to perform a matchmaking of the 3D user shopping profile to products; and
multiple products tags configured to allow the user to capture products selected from the shopping assistant database based on the 3D user shopping profile to determine a fit of the 3D user shopping profile on one or more of the captured products,
wherein the mobile device application is further configured to receive feedback from another user relating to the captured products and to perform an updated matchmaking of the 3D user shopping profile to products based on at least the feedback from the other user.

2. The shopping assistant system of claim 1, further comprising one or more image scanners configured to capture at least a part of a body that relates to an anatomical profile of a user, to allow capture of length, breadth and depth of the part of the body.

3. The shopping assistant system of claim 1, wherein the image of the standing surface includes one or more markings configured to assist in capturing of at least the part of the body of the user.

4. The shopping assistant system of claim 1, wherein the image of the standing surface includes one or more markings configured to assist in positioning of a body part to be scanned.

5. The shopping assistant system of claim 1, wherein the multiple product tags are scannable.

6. The shopping assistant system of claim 1, further comprising a proximity sensor configured to identify a user when the user enters a selected geographical zone.

7. The shopping assistant system of claim 1, further comprising a 3D user shopping profile for each of a plurality of users, wherein each 3D user shopping profile allows a mobile device user to shop for another user using the other user's shopping profile.

8. The shopping assistant system of claim 1, wherein the mobile device application is further configured to provide, to a social network, a 3D rendering of one or more of the captured products on the 3D user shopping profile, and wherein the feedback received from the other user is received over the social network.

9. The shopping assistant system of claim 1, wherein the feedback received from the other user is received from a computing device in a store associated to the shopping assistance server.

10. A method for in-store shopping enhancement, comprising:
   detecting a user entering a shopping area, using a proximity sensor associated with a shopping assistant standing surface;
   identifying the user with a new or known user profile;
   capturing of at least a part of a body using one or more sensors when the user is positioned on the shopping assistant standing surface;
   generating a user 3D shopping profile of the user based on capturing the at least a part of the body;
   sending the user 3D shopping profile to a mobile device associated with the user, wherein the user 3D shopping profile is usable in a shopping assistant application;
   identifying a selected product, based on the user scanning a product tag using an in-store apparatus;
   providing the user with shopping assistance for the selected product by determining a fit of the user 3D shopping profile on the selected product, wherein the shopping assistance includes display the fit of the selected product on the user 3D shopping profile;
   receiving feedback from another user relating to the selected product; and
   identifying an updated selected product, based on at least the feedback from the other user.

11. The method of claim 10, further comprising ordering the selected product using the mobile device.

12. The method of claim 10, further comprising customizing the selected product using the mobile device.

13. The method of claim 10 further comprising ordering a customized product using the mobile device.

14. The method of claim 10, further comprising providing the user product inventory information.

15. The method of claim 10, further comprising fitting the selected product on a user shopping profile avatar associated with the user 3D shopping profile.

16. The method of claim 10, further comprising sending a fitted user profile avatar to a social media system for viewing by selected social media users connected to the user.

17. The method of claim 10, further comprising providing shopping recommendations based on the user 3D shopping profile and/or user shopping behavior.

18. The method of claim 10, further comprising enhancing the user 3D shopping profile using one or more capturing elements selected from the group consisting of a pressure sensor, image sensor, laser, and light sensor.

19. The method of claim 10, further comprising adding additional user shopping profiles to the mobile device.

20. The method of claim 10, further comprising converting the user 3D shopping profile from the in-store apparatus to the mobile device.

* * * * *